(12) United States Patent
Ogawa et al.

(10) Patent No.: US 10,119,075 B2
(45) Date of Patent: *Nov. 6, 2018

(54) LIQUID CRYSTAL DISPLAY DEVICE AND METHOD FOR MANUFACTURING THE SAME

(71) Applicant: DIC Corporation, Tokyo (JP)

(72) Inventors: Shinji Ogawa, Kita-adachi-gun (JP); Yoshinori Iwashita, Kita-adachi-gun (JP); Takeshi Kuriyama, Kita-adachi-gun (JP); Hyobok Cha, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/023,149

(22) PCT Filed: Sep. 18, 2014

(86) PCT No.: PCT/JP2014/074670
§ 371 (c)(1),
(2) Date: Mar. 18, 2016

(87) PCT Pub. No.: WO2015/041285
PCT Pub. Date: Mar. 26, 2015

(65) Prior Publication Data
US 2016/0230096 A1   Aug. 11, 2016

(30) Foreign Application Priority Data
Sep. 20, 2013 (JP) .................................. 2013-195481

(51) Int. Cl.
*G02F 1/1333* (2006.01)
*C09K 19/56* (2006.01)
*C09K 19/20* (2006.01)
*C08F 222/10* (2006.01)
*G02F 1/1337* (2006.01)
*C09K 19/30* (2006.01)
*G02F 1/1341* (2006.01)
*G02F 1/1343* (2006.01)
(Continued)

(52) U.S. Cl.
CPC ........ *C09K 19/56* (2013.01); *C08F 222/1006* (2013.01); *C09K 19/2014* (2013.01); *C09K 19/3003* (2013.01); *G02F 1/1341* (2013.01); *G02F 1/133707* (2013.01); *G02F 1/133753* (2013.01); *G02F 1/133788* (2013.01); *G02F 1/134309* (2013.01); *C09K 2019/0448* (2013.01); *C09K 2019/122* (2013.01); *C09K 2019/123* (2013.01); *C09K 2019/301* (2013.01); *C09K 2019/3004* (2013.01); *C09K 2019/3009* (2013.01); *C09K 2019/3016* (2013.01); *C09K 2019/3027* (2013.01); *G02F 1/133514* (2013.01); *G02F 1/133723* (2013.01); *G02F 2001/13415* (2013.01); *G02F 2001/133742* (2013.01); *G02F 2001/133761* (2013.01)

(58) Field of Classification Search
CPC ................ C09K 19/56; C09K 19/2014; C09K 19/3003; C09K 2019/0448; C09K 2019/122; C09K 2019/3009; C09K 2019/3004; C09K 2019/301; C09K 2019/3016; C09K 2019/3027; C09K 2019/123; G02F 1/1333; G02F 1/133788; G02F 1/133514; G02F 1/133707; G02F 1/133723; G02F 1/133753; G02F 1/1341; G02F 1/134309; G02F 2001/133742; G02F 2001/133761; G02F 2001/13415; C08F 222/1006
USPC ...................................... 252/299.01; 428/1.1
See application file for complete search history.

(56) References Cited

U.S. PATENT DOCUMENTS

2007/0002214 A1   1/2007 Sasabayashi
2011/0261295 A1  10/2011 Kim
(Continued)

FOREIGN PATENT DOCUMENTS

JP         6-235925 A    8/1994
JP      2002-357830 A   12/2002
(Continued)

OTHER PUBLICATIONS

International Search Report dated Dec. 16, 2014, issued in counterpat International Application No. PCT/JP2014/074670 (1 page).
(Continued)

*Primary Examiner* — Geraldina Visconti
(74) *Attorney, Agent, or Firm* — Westerman, Hattori, Daniels & Adrian, LLP

(57) ABSTRACT

A liquid crystal display device with few drop marks left during manufacture is provided without degrading the image-sticking characteristics of the liquid crystal display device or other characteristics fundamental to liquid crystal display devices, such as dielectric anisotropy, viscosity, upper nematic phase temperature limit, and rotational viscosity ($\gamma_1$), and a method for manufacturing such a liquid crystal display device is also provided. A liquid crystal display device 10 according to the present invention includes a first substrate 11, a second substrate 12, a liquid crystal composition layer 13 disposed therebetween, and vertical alignment layers 16 and 17 containing a polymer of a monofunctional reactive-group-containing polymerizable compound and a polyfunctional reactive-group-containing polymerizable compound.

12 Claims, 1 Drawing Sheet

(51) Int. Cl.
*C09K 19/04* (2006.01)
*C09K 19/12* (2006.01)
*G02F 1/1335* (2006.01)

(56) References Cited

U.S. PATENT DOCUMENTS

2012/0229744 A1   9/2012  Hattori et al.
2016/0230096 A1   8/2016  Ogawa et al.
2016/0304782 A1*  10/2016  Ogawa ............... C09K 19/2014

FOREIGN PATENT DOCUMENTS

| JP | 2004-286984 A | 10/2004 |
| JP | 2006-58755 A | 3/2006 |
| JP | 2010-107536 A | 5/2010 |
| JP | 2011-227284 A | 11/2011 |
| JP | 2012-141576 A | 7/2012 |
| WO | 2011/055643 A1 | 5/2011 |

OTHER PUBLICATIONS

International Search Report dated Mar. 10, 2015, issued in Application No. PCT/JP2014/082112.
Non-Final Office Action dated Apr. 9, 2018, issued in U.S. Appl. No. 15/105,144.

* cited by examiner

[Fig. 1]
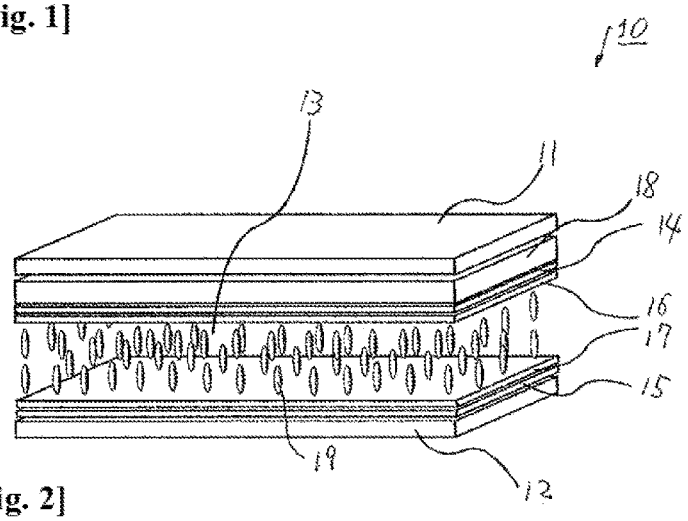
[Fig. 2]
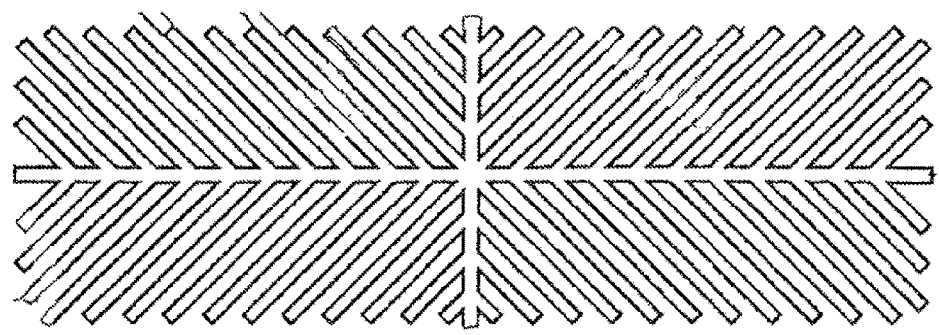
[Fig. 3]
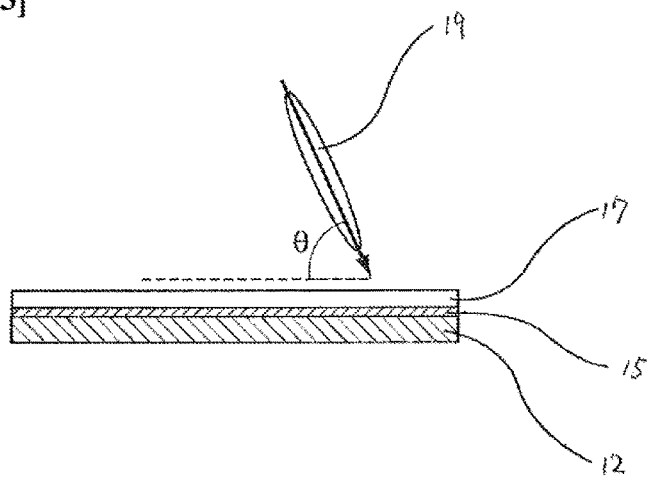

LIQUID CRYSTAL DISPLAY DEVICE AND METHOD FOR MANUFACTURING THE SAME

TECHNICAL FIELD

The present invention relates to liquid crystal display devices useful as components of products such as liquid crystal display televisions and to methods for manufacturing such liquid crystal display devices.

BACKGROUND ART

Liquid crystal display devices are used in products such as watches, calculators, measuring instruments, automotive instrument panels, word processors, electronic organizers, printers, computers, televisions, clocks, and advertisement boards. Typical types of liquid crystal displays include twisted nematic (TN) displays, super-twisted nematic (STN) displays, and thin-film transistor (TFT) displays such as vertical alignment (VA) and in-plane switching (IPS) displays. These liquid crystal display devices require liquid crystal compositions that are stable to external factors such as moisture, air, heat, and light, that exhibit a liquid crystal phase over a wide temperature range centered on room temperature, and that have low viscosity and low driving voltage. These liquid crystal compositions are composed of several to tens of compounds to optimize their properties such as dielectric anisotropy ($\Delta\varepsilon$) and refractive index anisotropy ($\Delta n$) depending on the specific liquid crystal display device.

VA displays use liquid crystal compositions of negative $\Delta\varepsilon$, which are widely used in products such as liquid crystal display televisions. All driving modes also require low driving voltage, fast response rate, and wide operating temperature range, specifically, a large absolute value of $\Delta\varepsilon$, a low viscosity ($\eta$), and a high nematic phase-isotropic liquid phase transition temperature ($T_{ni}$). The liquid crystal compositions also require the $\Delta n$ thereof to be adjusted to an appropriate range depending on the cell gap by taking into account the product of $\Delta n$ and the cell gap (d), i.e., $\Delta n \times d$. In addition, liquid crystal display devices used in applications such as televisions, where fast response rates are desired, require liquid crystal compositions with a low rotational viscosity ($\gamma_1$).

To improve the viewing-angle characteristics of VA displays, multi-domain vertical alignment (MVA) liquid crystal display devices have been widely used. This technology divides each pixel into a plurality of domains in which liquid crystal molecules are oriented in different directions by providing protrusions on the substrate. Although MVA liquid crystal display devices have good viewing-angle characteristics, they have the following problems. The response rate of the liquid crystal molecules near the projections on the substrate differs from that of the liquid crystal molecules away from the projections. The liquid crystal molecules away from the projections have a slower response rate and thus contribute to an insufficient total response rate. The projections also decrease the transmittance. To solve these problems, polymer-sustained alignment (PSA) liquid crystal display devices (including polymer-stabilized liquid crystal display devices) have been developed. This technology, unlike normal MVA liquid crystal display devices, induces a uniform pretilt angle in each pixel domain without providing nontransparent protrusions in the cell. PSA liquid crystal display devices are manufactured by adding a small amount of reactive monomer to a liquid crystal composition, introducing the liquid crystal composition into a liquid crystal cell, and irradiating the liquid crystal composition with radiation to polymerize the reactive monomer in the liquid crystal composition while applying a voltage across electrodes. This technology allows an appropriate pretilt angle to be induced in each pixel domain and thus provides improved contrast due to improved transmittance and fast response rate due to a uniform pretilt angle (see, for example, PTL 1). Unfortunately, PSA liquid crystal display devices require a reactive monomer to be added to the liquid crystal composition. This causes many problems for active-matrix liquid crystal display devices, which require high voltage-holding ratios, and also leads to display defects such as image-sticking.

One technique has been developed to overcome the disadvantages of PSA liquid crystal display devices and to induce a uniform pretilt angle to liquid crystal molecules without mixing any substance other than liquid crystal materials in the liquid crystal composition. This technique involves mixing a reactive monomer in an alignment layer material, introducing a liquid crystal composition into a liquid crystal cell, and irradiating an alignment layer with radiation to polymerize the reactive monomer in the alignment layer while applying a voltage across electrodes (see, for example, PTLs 2, 3, and 4).

With the increasing size of liquid crystal display devices, significant changes have also been made to the process of manufacturing liquid crystal display devices.

The conventional vacuum injection process, which requires a considerable period of time for the manufacture of large-screen panels, has increasingly been replaced by one-drop filling (ODF) process (see, for example, PTL 5). This process, requiring a shorter period of time for injection than vacuum injection, has become predominant in the manufacture of large-screen panels. Unfortunately, this process presents a new problem: droplets of liquid crystal composition leave drop marks on liquid crystal display devices during manufacture. Drop marks are defined as the phenomenon where droplets of liquid crystal composition leave marks that appear white when a black image is displayed. The problem of drop marks is particularly noticeable with the above technique in which a reactive monomer is added to an alignment layer material to induce a uniform pretilt angle to liquid crystal molecules since the reactive monomer is present as a foreign substance in the alignment layer during the dispensing of droplets of liquid crystal composition onto the substrate. Although drop marks generally occur depending on the liquid crystal materials selected, the mechanism is not fully understood.

One method for reducing drop marks has been disclosed (see, for example, PTL 6). This method involves polymerizing a polymerizable compound mixed in a liquid crystal composition to form a polymer layer in the liquid crystal composition layer, thereby reducing drop marks that occur depending on the alignment control film.

Unfortunately, as in PSA technology, this method presents the problem of display image-sticking due to the reactive monomer added to the liquid crystal composition and is not sufficiently effective in reducing drop marks. Thus, there is a need to develop a liquid crystal display device with good image-sticking characteristics and few drop marks while maintaining the characteristics fundamental to liquid crystal display devices.

CITATION LIST

Patent Literature

PTL 1: Japanese Unexamined Patent Application Publication No. 2002-357830

PTL 2: Japanese Unexamined Patent Application Publication No. 2010-107536
PTL 3: The specification of U.S. Patent Application Publication No. 2011/261295
PTL 4: Japanese Unexamined Patent Application Publication No. 2011-227284
PTL 5: Japanese Unexamined Patent Application Publication No. 6-235925
PTL 6: Japanese Unexamined Patent Application Publication No. 2006-58755

SUMMARY OF INVENTION

Technical Problem

In view of the foregoing, an object of the present invention is to provide a liquid crystal display device with few drop marks left during manufacture without degrading the image-sticking characteristics of the liquid crystal display device or other characteristics fundamental to liquid crystal display devices, such as dielectric anisotropy, viscosity, upper nematic phase temperature limit, and rotational viscosity ($\gamma_1$), and also to provide a method for manufacturing such a liquid crystal display device.

Solution to Problem

To solve the foregoing problems, the inventors have researched various combinations of liquid crystal compositions and methods for inducing a pretilt angle in liquid crystal display devices. After this research, the inventors have discovered that the foregoing problems can be solved by the use of a particular liquid crystal composition in combination with a method involving forming a vertical alignment layer containing a reactive monomer, introducing a liquid crystal composition into a liquid crystal, cell, and irradiating the alignment layer with radiation to polymerize the reactive monomer in the alignment layer while applying a voltage across electrodes. This discovery has led to the present invention.

Specifically, the present invention provides a liquid crystal display device including a first substrate having a common electrode, a second substrate having a pixel electrode, and a liquid crystal composition layer disposed between the first and second substrates. A charge is applied across the common electrode and the pixel electrode substantially perpendicularly to the first and second substrates to control liquid crystal molecules in the liquid crystal composition layer.

At least one of the first and second substrates has a vertical alignment layer that controls the orientation of the liquid crystal molecules in the liquid crystal composition layer substantially perpendicularly to surfaces of the first and second substrates adjacent to the liquid crystal composition layer. The vertical alignment layer contains a polymer of a monofunctional reactive-group-containing polymerizable compound and a polyfunctional reactive-group-containing polymerizable compound.

The present invention further provides a method for manufacturing a liquid crystal display device. This method includes applying an alignment material containing a monofunctional reactive-group-containing polymerizable compound, a polyfunctional reactive-group-containing polymerizable compound, and a vertical alignment material to at least one of a first substrate having a common electrode and a second substrate having a pixel electrode; heating the alignment material to form an alignment layer; providing a liquid crystal composition between the first and second substrates; and irradiating the liquid crystal composition with radiation to polymerize the polymerizable compounds in the alignment layer while applying a voltage across the common electrode and the pixel electrode.

The monofunctional reactive-group-containing polymerizable compound is a polymerizable compound represented by general formula (VI) below.

[Chem. 1]

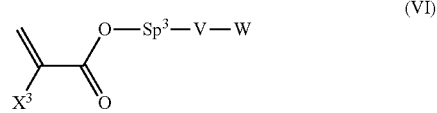

In the formula, $X^3$ is hydrogen or methyl; $Sp^3$ is a single bond, an alkylene group of 1 to 8 carbon atoms, or —O—$(CH_2)_t$— (where t is an integer of 2 to 7, and the oxygen atom is linked to the aromatic ring); V is a linear or branched polyvalent alkylene group of 2 to 20 carbon atoms or a polyvalent cyclic substituent of 5 to 30 carbon atoms, where the alkylene group in the polyvalent alkylene group is optionally substituted with oxygen such that no oxygen atoms are adjacent to each other, is optionally substituted with an alkyl group of 5 to 20 carbon atoms (where the alkylene group in the group is optionally substituted with oxygen such that no oxygen atoms are adjacent to each other), and is optionally substituted with a cyclic substituent; and W is hydrogen, halogen, or an alkylene group of 1 to 8 carbon atoms.

The polyfunctional reactive-group-containing polymerizable compound is a polymerizable compound represented by general formula (V) below.

[Chem. 2]

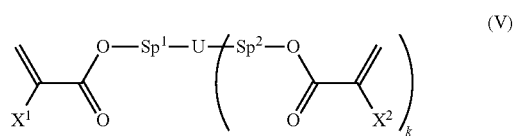

In the formula, $X^1$ and $X^2$ are each independently hydrogen or methyl; $Sp^1$ and $Sp^2$ are each independently a single bond, an alkylene group of 1 to 8 carbon atoms, or —O—$(CH_2)_s$— (where s is an integer of 2 to 7, and the oxygen atom is linked to the aromatic ring); U is a linear or branched polyvalent alkylene group of 2 to 20 carbon atoms or a polyvalent cyclic substituent of 5 to 30 carbon atoms, where the alkylene group in the polyvalent alkylene group is optionally substituted with oxygen such that no oxygen atoms are adjacent to each other, is optionally substituted with an alkyl group of 5 to 20 carbon atoms (where the alkylene group in the group is optionally substituted with oxygen such that no oxygen atoms are adjacent to each other), and is optionally substituted with a cyclic substituent; and k is an integer of 1 to 5.

Advantageous Effects of Invention

The present invention provides a liquid crystal display device with fast response rate, good image-sticking characteristics, and few drop marks left during manufacture. Such liquid crystal display devices are useful in products such as liquid crystal display televisions and monitors.

The present invention also allows efficient manufacture of liquid crystal display devices with few drop marks.

BRIEF DESCRIPTION OF DRAWINGS

FIG. 1 is a schematic perspective view illustrating a light-emitting device according to an embodiment of the present invention.

FIG. 2 is a schematic plan view illustrating an example slit electrode (comb-like electrode) used in the liquid crystal display device according to the present invention.

FIG. 3 illustrates the definition of the pretilt angle of the liquid crystal display device according to the present invention.

DESCRIPTION OF EMBODIMENTS

A liquid crystal display device and a method of manufacture thereof according to an embodiment of the present invention will now be described.

This embodiment is provided for illustration purposes to better understand the spirit of the invention and is not intended to limit the invention unless otherwise stated.

Liquid Crystal Display Device

The liquid crystal display device according to the present invention includes a pair of substrates and a liquid crystal composition layer disposed therebetween. This liquid crystal display device is operated as an optical switch by applying a voltage across the liquid crystal composition layer to induce the Fréedericksz transition of liquid crystal molecules in the liquid crystal composition layer. This may be achieved by commonly known and used technologies.

For typical vertical-alignment liquid crystal display devices including two substrates having electrodes for inducing the Fréedericksz transition of liquid crystal molecules, a charge is applied across the two substrates perpendicularly thereto. In this case, one electrode serves as a common electrode, whereas the other electrode serves a pixel electrode. A most typical embodiment of this type is illustrated below.

FIG. 1 is a schematic perspective view illustrating a light-emitting device according to an embodiment of the present invention.

A liquid crystal display device 10 according to this embodiment generally includes a first substrate 11, a second substrate 12, a liquid crystal composition layer 13 disposed between the first substrate 11 and the second substrate 12, a common electrode 14 disposed on a surface of the first substrate 11 facing the liquid crystal composition layer 13, pixel electrodes 15 disposed on a surface of the second substrate 12 facing the liquid crystal composition layer 13, a vertical alignment layer 16 disposed on a surface of the common electrode 14 facing the liquid crystal composition layer 13, a vertical alignment layer 17 disposed on surfaces of the pixel electrodes 15 facing the liquid crystal composition layer 13, and a color filter 18 disposed between the first substrate 11 and the common electrode 14.

The first substrate 11 and the second substrate 12 are glass or plastic substrates. Examples of plastic substrates include resin substrates such as acrylic resin, methacrylic resin, polyethylene terephthalate, polycarbonate, and cyclic olefin resin substrates.

The common electrode 14 is typically made of a transparent material such as indium-doped tin oxide (ITO).

The pixel electrodes 15 are typically made of a transparent material such as indium-doped tin oxide (ITO). The pixel electrodes 15 are arranged in a matrix on the second substrate 12. The pixel electrodes 15 are controlled via drain electrodes of active elements such as TFT switching elements. The TFT switching elements have a matrix of gate lines, which serve as address signal lines, and source lines, which serve as data lines. The structure of the TFT switching elements is not illustrated herein.

To improve the viewing-angle characteristics, each pixel may be divided into several domains in which liquid crystal molecules are tilted in different directions. This may be done by providing a pixel electrode having a stripe or V-shaped pattern of slits (areas where no electrode is formed) in each pixel.

FIG. 2 is a schematic plan view illustrating a typical form of slit electrode (comb-like electrode) for dividing each pixel into four domains. This slit electrode has a comb-like pattern of slits extending from the center of the pixel in four directions. When no voltage is applied, the liquid crystal molecules in each pixel are oriented substantially perpendicularly to the substrate. When a voltage is applied, the directors of the liquid crystal molecules are oriented in four different directions toward horizontal alignment. This allows each pixel to be divided into a plurality of domains in which liquid crystal molecules are oriented in different directions, thus providing a significantly wide viewing angle.

Examples of methods for pixel division include the formation of slits in the pixel electrodes, the formation of structures such as ridges in the pixels, and the formation of electrodes other than the pixel electrodes and the common electrode. Although all these methods may be used to orient liquid crystal molecules in different directions, slit electrodes are preferred for reasons of transparency and ease of manufacture. Pixel electrodes with slits have no driving force on liquid crystal molecules when no voltage is applied and thus cannot induce a pretilt angle to the liquid crystal molecules; however, they can be used in combination with alignment layer materials used in the present invention to induce a pretilt angle while achieving a wide viewing angle through pixel division.

As used herein, the term "pretilt angle" refers to a slight deviation of the director of the liquid crystal molecules from the direction perpendicular to the substrate surfaces (the surfaces of the first substrate 11 and the second substrate 12 adjacent to the liquid crystal composition layer 13) without the application of a voltage.

When no voltage is applied to the vertical-alignment (VA) liquid crystal display device according to the present invention, the director of the liquid crystal molecules is oriented substantially perpendicularly to the substrate surfaces. The liquid crystal molecules are typically aligned vertically using vertical alignment layers. Examples of materials for vertical alignment layers (vertical alignment layer materials) include polyimides, polyamides, and polysiloxanes, preferably polyimides. Although the vertical alignment layer material may contain a mesogenic moiety, it preferably contains no mesogenic moiety, unlike the polymerizable compounds described later. If the vertical alignment layer material contains a mesogenic moiety, it may cause problems such as image-sticking due to disturbance in molecular arrangement after repeated application of a voltage. If the vertical alignment layers are made of a polyimide, they are preferably formed from a mixture of tetracarboxylic dianhydride and a diisocyanate, a polyamic acid, or a solution or dispersion of a polyimide in a solvent. The polyimide is preferably present in the polyimide solution or dispersion in an amount of 1% to 10% by mass, more preferably 3% to 5% by mass.

If polysiloxane vertical alignment layers are used, they may be formed from a solution of a polysiloxane produced by heating a mixture of an alkoxy-containing silicon compound, an alcohol derivative, and an oxalic acid derivative in a predetermined ratio.

The vertical alignment layers, such as polyimide vertical alignment layers, used in the liquid crystal display device according to the present invention contain a polymer of reactive-group-containing polymerizable compounds. These polymerizable compounds function to fix the pretilt angle of the liquid crystal molecules. Slit electrodes, for example, can be used to tilt the directors of the liquid crystal molecules in different directions in each pixel when a voltage is applied; however, even if slit electrodes are used, the liquid crystal molecules are oriented almost perpendicularly to the substrate surfaces and thus have no pretilt angle when no voltage is applied.

PSA technology, as discussed above, induces an appropriate pretilt angle by irradiating a liquid crystal composition containing a reactive monomer with ultraviolet or other radiation to polymerize the reactive monomer in the liquid crystal composition while applying a voltage across electrodes to slightly tilt the liquid crystal molecules.

As in PSA technology, an appropriate pretilt angle is induced in the liquid crystal display device according to the present invention by irradiating the liquid crystal composition with ultraviolet or other radiation while applying a voltage across the electrodes to slightly tilt the liquid crystal molecules. However, unlike PSA technology, the liquid crystal composition contains no polymerizable compound. Specifically, the present invention differs essentially from PSA technology in that the invention does not rely on the phase separation of polymerizable compounds; instead, a pretilt angle is induced by forming vertical alignment layers, such as polyimide vertical alignment layers, containing reactive-group-containing polymerizable compounds, placing the liquid crystal composition between the substrates, and curing the polymerizable compounds while applying a voltage thereto.

As used herein, the term "substantially perpendicularly" means that the director of vertically aligned liquid crystal molecules is slightly tilted from the perpendicular direction to induce a pretilt angle. Preferably, the term "substantially perpendicularly" refers to an angle of 89° to 85°, more preferably 89° to 87°, where 90° means perfect vertical alignment and 0° means homogeneous alignment (i.e., the liquid crystal molecules are oriented parallel to the substrate surfaces).

Vertical alignment layers containing a polymer of a reactive-group-containing polymerizable compounds are formed by the action of the polymerizable compounds mixed in the vertical alignment layer material. Although it is believed that the vertical alignment layers are intricately combined with the polymerizable compounds to form a polymer alloy, the exact structure is not fully understood.

Reactive-Group-Containing Polymerizable Compounds

The reactive-group-containing polymerizable compounds include a monofunctional polymerizable compound having one reactive group and a polyfunctional polymerizable compound, such as a di- or trifunctional polymerizable compound, having two or more reactive groups. The reactive-group-containing polymerizable compounds may or may not contain a mesogenic moiety.

The reactive groups in the reactive-group-containing polymerizable compounds are preferably photopolymerizable substituents, particularly if vertical alignment layers are formed by thermal polymerization. This prevents the reaction of the reactive-group-containing polymerizable compounds during the thermal polymerization of the vertical alignment layer material.

Among reactive-group-containing polymerizable compounds, specific preferred monofunctional reactive-group-containing polymerizable compounds include polymerizable compounds represented by general formula (VI) below.

[Chem. 3]

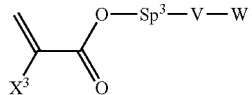

(VI)

In the formula, $X^3$ is hydrogen or methyl; $Sp^3$ is a single bond, an alkylene group of 1 to 8 carbon atoms, or —O—$(CH_2)_t$— (where t is an integer of 2 to 7, and the oxygen atom is linked to the aromatic ring); V is a linear or branched polyvalent alkylene group of 2 to 20 carbon atoms or a polyvalent cyclic substituent of 5 to 30 carbon atoms, where the alkylene group in the polyvalent alkylene group is optionally substituted with oxygen such that no oxygen atoms are adjacent to each other, is optionally substituted with an alkyl group of 5 to 20 carbon atoms (where the alkylene group in the group is optionally substituted with oxygen such that no oxygen atoms are adjacent to each other), and is optionally substituted with a cyclic substituent; and W is hydrogen, halogen, or an alkylene group of 1 to 8 carbon atoms.

Although $X^3$ in general formula (VI) above is hydrogen or methyl, $X^3$ is preferably hydrogen if fast reaction rates are desired and is preferably methyl if low residual reactant contents are desired.

Although $Sp^3$ in general formula (VI) above is a single bond, an alkylene group of 1 to 8 carbon atoms, or —O—$(CH_2)_t$— (where t is an integer of 2 to 7, and the oxygen atom is linked to the aromatic ring), shorter carbon chains are preferred. Specifically, $Sp^3$ is preferably a single bond or an alkylene group of 1 to 5 carbon atoms, more preferably a single bond or an alkylene group of 1 to 3 carbon atoms. If $Sp^3$ is —O—$(CH_2)_t$—, t is preferably 1 to 5, more preferably 1 to 3.

Although V in general formula (VI) above is a linear or branched polyvalent alkylene group of 2 to 20 carbon atoms or a polyvalent cyclic substituent of 5 to 30 carbon atoms, the alkylene group in the polyvalent alkylene group may optionally be substituted with oxygen such that no oxygen atoms are adjacent to each other, may optionally be substituted with an alkyl group of 5 to 20 carbon atoms (where the alkylene group in the group is optionally substituted with oxygen such that no oxygen atoms are adjacent to each other), and may optionally be substituted with a cyclic substituent, preferably with two or more cyclic substituents.

Specific polymerizable compounds represented by general formula (VI) include compounds represented by general formula (X1a).

[Chem. 4]

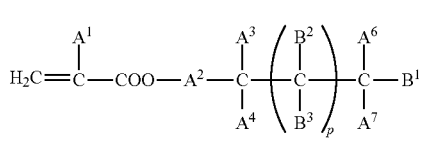
(X1a)

In the formula, $A^1$ is hydrogen or methyl;

$A^2$ is a single bond or an alkylene group of 1 to 8 carbon atoms (where one or more methylene groups in the alkylene group are each independently optionally replaced with oxygen, —CO—, —COO—, or —OCO— such that no oxygen atoms are directly linked to each other, and one or more hydrogen atoms in the alkylene group are each independently optionally replaced with fluorine, methyl, or ethyl);

$A^3$ and $A^6$ are each independently hydrogen, halogen, or an alkyl group of 1 to 10 carbon atoms (where one or more methylene groups in the alkyl group are each independently optionally replaced with oxygen, —CO—, —COO—, or —OCO— such that no oxygen atoms are directly linked to each other, and one or more hydrogen atoms in the alkyl group are each independently optionally replaced with halogen or an alkyl group of 1 to 17 carbon atoms);

$A^4$ and $A^7$ are each independently hydrogen, halogen, or an alkyl group of 1 to 10 carbon atoms (where one or more methylene groups in the alkyl group are each independently optionally replaced with oxygen, —CO—, —COO—, or —OCO— such that no oxygen atoms are directly linked to each other, and one or more hydrogen atoms in the alkyl group are each independently optionally replaced with halogen or an alkyl group of 1 to 9 carbon atoms);

p is 1 to 10; and $B^1$, $B^2$, and $B^3$ are each independently hydrogen or a linear or branched alkyl group of 1 to 10 carbon atoms (where one or more methylene groups in the alkyl group are each independently optionally replaced with oxygen, —CO—, —COO—, or —OCO— such that no oxygen atoms are directly linked to each other, and one or more hydrogen atoms in the alkyl group are each independently optionally replaced with halogen or a trialkoxysilyl group of 3 to 6 carbon atoms.

Other specific polymerizable compounds represented by general formula (VI) include compounds represented by general formula (X1b).

[Chem. 5]

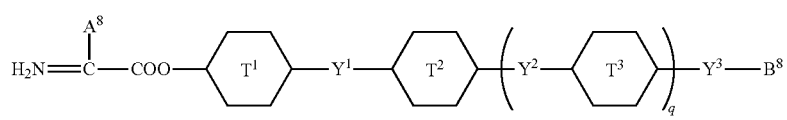
(X1b)

In the formula, $A^8$ is hydrogen or methyl; and the six-membered rings, $T^1$, $T^2$, and $T^3$, are each independently any of the following moieties (where q is an integer of 1 to 4).

[Chem. 6]

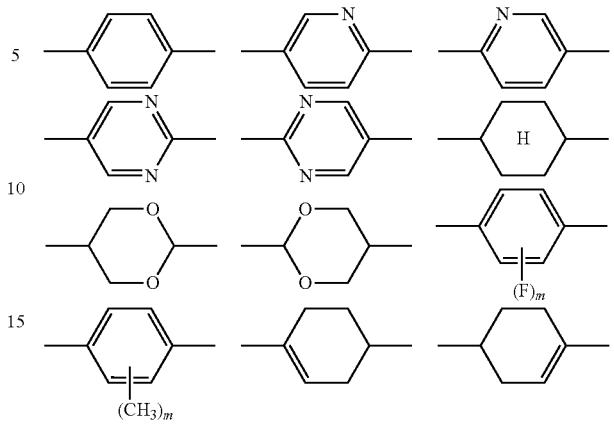

In the formula, q is 0 or 1;

$Y^1$ and $Y^2$ are each independently a single bond, —CH$_2$CH$_2$—, —CH$_2$O—, —OCH$_2$—, —COO—, —OCO—, —C≡C—, —CH=CH—, —CF=CF—, —(CH$_2$)$_4$—, —CH$_2$CH$_2$CH$_2$O—, —OCH$_2$CH$_2$CH$_2$—, —CH$_2$=CHCH$_2$CH$_2$—, or —CH$_2$CH$_2$CH=CH—;

$Y^3$ is a single bond, —COO—, or —OCO—; and $B^3$ is a hydrocarbyl group of 1 to 18 carbon atoms.

Still other specific polymerizable compounds represented by general formula (VI) include compounds represented by general formula (X1c).

[Chem. 7]

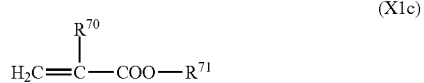
(X1c)

In the formula, $R^{70}$ is hydrogen or methyl, and $R^{71}$ is a hydrocarbyl group containing a condensed ring.

Among reactive-group-containing polymerizable compounds, preferred polyfunctional reactive-group-containing polymerizable compounds include polymerizable compounds represented by general formula (V) below.

[Chem. 8]

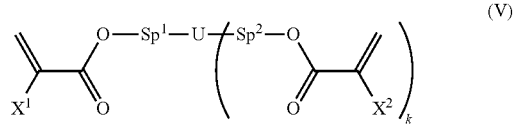
(V)

In the formula, $X^1$ and $X^2$ are each independently hydrogen or methyl; $Sp^1$ and $Sp^2$ are each independently a single bond, an alkylene group of 1 to 8 carbon atoms, or —O—$(CH_2)_s$— (where s is an integer of 2 to 7, and the oxygen atom is linked to the aromatic ring); U is a linear or branched polyvalent alkylene group of 2 to 20 carbon atoms or a polyvalent cyclic substituent of 5 to 30 carbon atoms, where the alkylene group in the polyvalent alkylene group is optionally substituted with oxygen such that no oxygen atoms are adjacent to each other, is optionally substituted with an alkyl group of 5 to 20 carbon atoms (where the alkylene group in the group is optionally substituted with oxygen such that no oxygen atoms are adjacent to each other), and is optionally substituted with a cyclic substituent; and k is an integer of 1 to 5.

Although $X^1$ and $X^2$ in general formula (V) above are each independently hydrogen or methyl, $X^1$ and $X^2$ are preferably hydrogen if fast reaction rates are desired and are preferably methyl if low residual reactant contents are desired.

Although $Sp^1$ and $Sp^2$ in general formula (V) above are each independently a single bond, an alkylene group of 1 to 8 carbon atoms, or —O—$(CH_2)_s$— (where s is an integer of 2 to 7, and the oxygen atom is linked to the aromatic ring), shorter carbon chains are preferred. Specifically, $Sp^1$ and Spj are preferably a single bond or an alkylene group of 1 to 5 carbon atoms, more preferably a single bond or an alkylene group of 1 to 3 carbon atoms. If $Sp^1$ or $Sp^2$ is —O—$(CH_2)_s$—, s is preferably 1 to 5, more preferably 1 to 3. More preferably, at least one of $Sp^1$ and $Sp^2$ is a single bond, and even more preferably, both of them are single bonds.

Although U in general formula (V) above is a linear or branched polyvalent alkylene group of 2 to 20 carbon atoms or a polyvalent cyclic substituent of 5 to 30 carbon atoms, the alkylene group in the polyvalent alkylene group may optionally be substituted with oxygen such that no oxygen atoms are adjacent to each other, may optionally be substituted with an alkyl group of 5 to 20 carbon atoms (where the alkylene group in the group is optionally substituted with oxygen such that no oxygen atoms are adjacent to each other), and may optionally be substituted with a cyclic substituent, preferably with two or more cyclic substituents.

Specifically, U in general formula (V) above is preferably any of formulas (Va-1) to (Va-5) below, more preferably any of formulas (Va-1) to (Va-3), even more preferably formula (Va-1).

[Chem. 9]

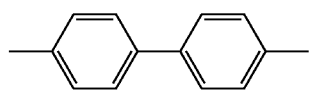
(Va-1)

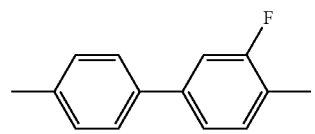
(Va-2)

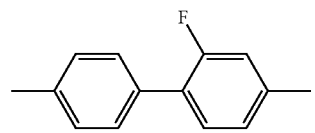
(Va-3)

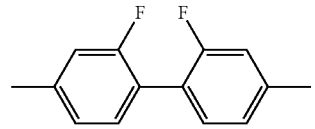
(Va-4)

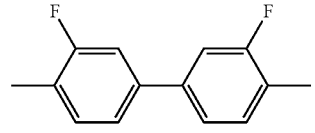
(Va-5)

In each formula, both ends are linked to $Sp^1$ and $Sp^2$.

If U has a cyclic structure, it is preferred that at least one of $Sp^1$ and $Sp^2$ is a single bond, and it is also preferred that both of them are single bonds.

Although k in general formula (V) above is an integer of 1 to 5, k is preferably 1, meaning a difunctional compound, or 2, meaning a trifunctional compound.

Difunctional compounds are more preferred.

Specific preferred compounds represented by general formula (V) above include compounds represented by general formula (Vb) below.

[Chem. 10]

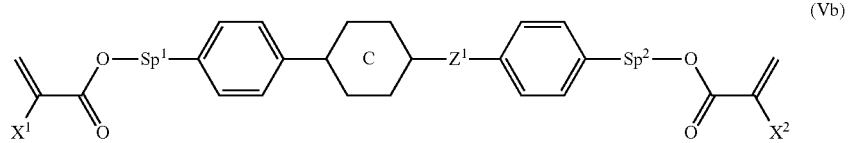
(Vb)

In the formula, $X^1$ and $X^2$ are each independently hydrogen or methyl; $Sp^1$ and $Sp^2$ are each independently a single bond, an alkylene group of 1 to 8 carbon atoms, or —O—$(CH_2)_s$— (where s is an integer of 2 to 7, and the oxygen atom is linked to the aromatic ring); $Z^1$ is —$OCH_2$—, —$CH_2O$—, —COO—, —OCO—, —$CF_2O$—, —$OCF_2$—, —$CH_2CH_2$—, —$CF_2CF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH$—COO—, —$CH_2CH_2$—OCO—, —COO—$CH_2$—, —OCO—$CH_2$—, —$CH_2$—COO—, —$CH_2$—OCO—, —$CY^1$=$CY^2$— (where $Y^1$ and $Y^2$ are each independently hydrogen or fluorine), —C≡C—, or a single bond; C is 1,4-phenylene, trans-1,4-cyclohexylene, or a single bond; and any hydrogen atom in any 1,4-phenylene group in the formula is optionally replaced with fluorine.

Although $X^1$ and $X^2$ in general formula (Vb) above are each independently hydrogen or methyl, diacrylate derivatives, where both $X^1$ and $X^2$ are hydrogen, and dimethacrylate derivatives, where both $X^1$ and $X^2$ are methyl, are preferred. Also preferred are compounds where one of $X^1$ and $X^2$ is hydrogen and the other is methyl. Among these compounds, diacrylate derivatives have the highest rates of polymerization, dimethacrylate derivatives have the lowest rates of polymerization, and asymmetrical compounds have intermediate rates of polymerization. Any suitable compound may be used depending on the purpose. In particular, dimethacrylate derivatives are preferred for PSA liquid crystal display devices.

Although $Sp^1$ and $Sp^2$ in general formula (Vb) above are each independently a single bond, an alkylene group of 1 to 8 carbon atoms, or —O—$(CH_2)_s$—, compounds where at least one of $Sp^1$ and $Sp^2$ is a single bond are preferred for PSA liquid crystal display devices. Such compounds include those where both of $Sp^1$ and $Sp^2$ are single bonds and those where one of $Sp^1$ and $Sp$ is a single bond and the other is an alkylene group of 1 to 8 carbon atoms or —O—$(CH_2)_s$—. In this case, the alkylene group preferably contains 1 to 4 carbon atoms, and s is preferably 1 to 4.

Although $Z^1$ in general formula (Vb) above is —$OCH_2$—, —$CH_2O$—, —COO—, —OCO—, —$CF_2O$—, —$OCF_2$—, —$CH_2CH_2$—, —$CF_2CF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH$—OCO—, —COO—$CH_2$—, —OCO—$CH_2$—, —$CH_2$—COO—, —$CH_2$—OCO—, —$CY^1$=$CY^1$— (where $Y^1$ and $Y^2$ are each independently hydrogen or fluorine), —C≡C—, or a single bond, $Z^1$ is preferably —$OCH_2$—, —$CH_2O$—, —COO—, —OCO—, —$CF_2O$—, —$OCF_2$—, —$CH_2CH_2$—, —$CF_2CF_2$—, or a single bond, more preferably —COO—, —OCO—, or a single bond, even more preferably a single bond.

Although C in general formula (Vb) above is 1,4-phenylene, trans-1,4-cyclohexylene, or a single bond, where any hydrogen atom is optionally replaced with fluorine, C is preferably 1,4-phenylene or a single bond. If C is a cyclic structure, rather than a single bond, $Z^1$ is preferably a linking group other than a single bond. If C is a single bond, $Z^1$ is preferably a single bond.

As discussed above, C in general formula (Vb) above is preferably a single bond; that is, the cyclic structure is preferably composed of two rings. Specific preferred polym-

[Chem. 11]

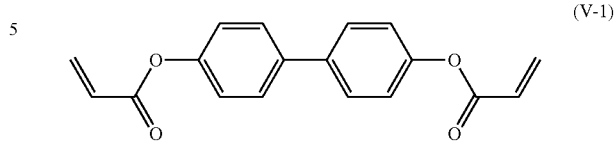
(V-1)

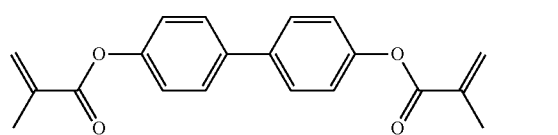
(V-2)

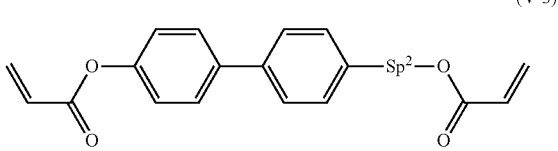
(V-3)

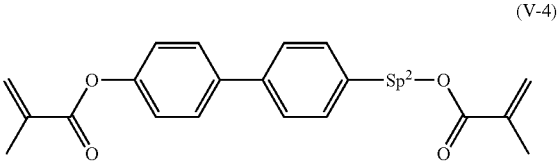
(V-4)

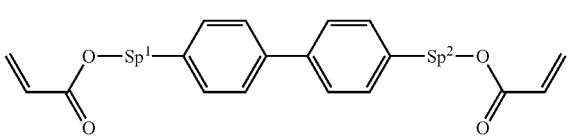
(V-5)

(V-6)

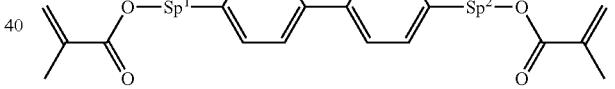

Other specific preferred compounds represented by general formula (V) above include compounds represented by general formula (Vc) below.

[Chem. 12]

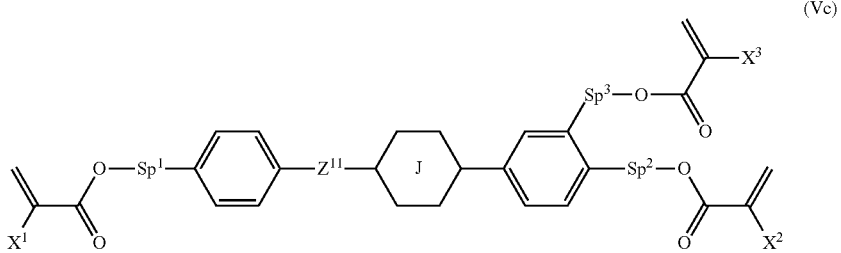
(Vc)

erizable compounds having a cyclic structure include the compounds represented by general formulas (V-1) to (V-6) below, more preferably the compounds represented by general formulas (V-1) to (V-4), most preferably the compound represented by general formula (V-2).

In the formula, $X^1$, $X^2$, and $X^3$ are each independently hydrogen or methyl; $Sp^1$, $Sp^2$, and $Sp^3$ are each independently a single bond, an alkylene group of 1 to 8 carbon atoms, or —O—$(CH_2)_s$— (where s is an integer of 2 to 7, and the oxygen atom is linked to the aromatic ring); $Z^{11}$ and $Z^{12}$ are each independently —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH—, —OCO—CH$_2$—, —CH$_2$—COO—, —CH$_2$—OCO—, —CY$^1$=CY$^2$— (where Y$^1$ and Y$^2$ are each independently hydrogen or fluorine), —C≡C—, or a single bond; J is 1,4-phenylene, trans-1,4-cyclohexylene, or a single bond; and any hydrogen atom in any 1,4-phenylene group in the formula is optionally replaced with fluorine.

Liquid Crystal Composition

The liquid crystal composition according to the present invention preferably contains, as a first component, a compound represented by general formula (I) below in an amount of 25% to 70% by mass, more preferably 30% to 60% by mass, even more preferably 35% to 50% by mass, most preferably 38% to 47% by mass.

[Chem. 13]

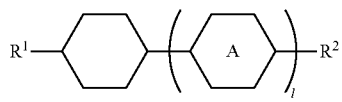

(I)

In the formula, R$^1$ are R$^2$ are each independently an alkyl group of 1 to 8 carbon atoms, an alkenyl group of 2 to 8 carbon atoms, an alkoxy group of 1 to 8 carbon atoms, or an alkenyloxy group of 2 to 8 carbon atoms; A is 1,4-phenylene or trans-1,4-cyclohexylene; and l is 1 or 2, where if l is 2, each A may be the same or different.

Although R$^1$ are R$^2$ in general formula (I) above are each independently an alkyl group of 1 to 8 carbon atoms, an alkenyl group of 2 to 8 carbon atoms, an alkoxy group of 1 to 8 carbon atoms, or an alkenyloxy group of 2 to 8 carbon atoms, R$^1$ are R$^2$ are preferably an alkyl group of 1 to 5 carbon atoms, an alkenyl group of 2 to 5 carbon atoms, an alkoxy group of 1 to 5 carbon atoms, or an alkenyloxy group of 2 to 5 carbon atoms, more preferably an alkyl group of 2 to 5 carbon atoms, an alkenyl group of 2 to 4 carbon atoms, an alkoxy group of 1 to 4 carbon atoms, or an alkenyloxy group of 2 to 4 carbon atoms, even more preferably an alkyl group of 2 to 5 carbon atoms or an alkenyl group of 2 to 4 carbon atoms.

If R$^1$ is an alkyl group, alkyl groups of 1, 3, or 5 carbon atoms are preferred. If R$^1$ is an alkenyl group, the following structures are preferred.

[Chem. 14]

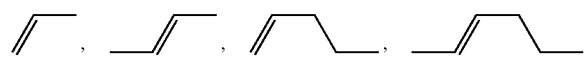

In each formula, the right end is linked to the cyclic structure.

Among these structures, vinyl, which is an alkenyl group of 2 carbon atoms, and 1-propenyl, which is an alkenyl group of 3 carbon atoms, are preferred.

Although R$^1$ and R$^2$ in general formula (I) above may be the same or different, they are preferably different. If both R$^1$ and R$^2$ are alkyl groups, they are preferably alkyl groups of 1, 3, or 5 carbon atoms that contain different numbers of atoms.

Compounds represented by general formula (I) above where at least one of R$^1$ and R$^2$ is an alkyl group of 3 to 5 carbon atoms are preferably present in an amount of 50% by mass or more, more preferably 70% by mass or more, even more preferably 80% by mass or more, of all compounds represented by general formula (I) above.

Compounds represented by general formula (I) above where at least one of R$^1$ and R$^2$ is an alkyl group of 3 carbon atoms are preferably present in an amount of 50% by mass or more, more preferably 70% by mass or more, even more preferably 80% by mass or more, most preferably 100%, of all compounds represented by general formula (I) above.

Although A in general formula (I) above is 1,4-phenylene or trans-1,4-cyclohexylene, A is preferably trans-1,4-cyclohexylene. Compounds represented by general formula (I) above where A is trans-1,4-cyclohexylene are preferably present in an amount of 50% by mass or more, more preferably 70% by mass or more, even more preferably 80% by mass or more, of all compounds represented by general formula (I) above.

Specific preferred compounds represented by general formula (I) above include compounds represented by general formulas (Ia) to (Ik) below.

[Chem. 15]

(Ia)

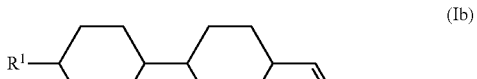

(Ib)

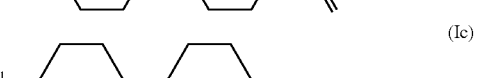

(Ic)

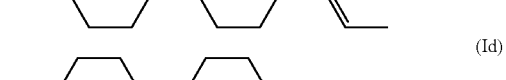

(Id)

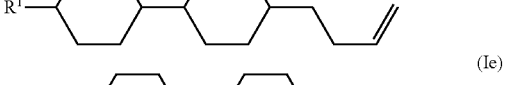

(Ie)

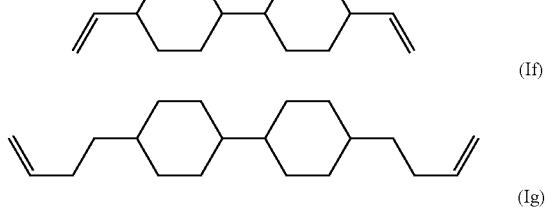

(If)

(Ig)

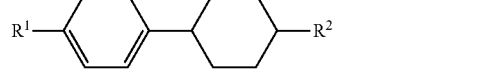

(Ih)

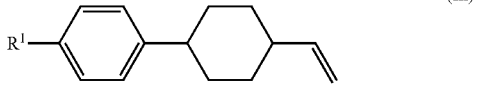

(Ii)

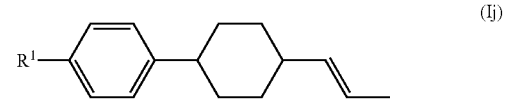

(Ij)

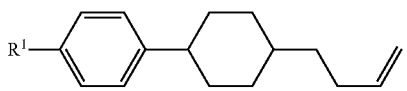
(Ik)

In each formula, $R^1$ and $R^2$ are each independently an alkyl group of 1 to 5 carbon atoms or an alkoxy group of 1 to 5 carbon atoms, preferably as defined for $R^1$ and $R^2$ in general formula (I).

Among general formulas (Ia) to (Ik) above, general formulas (Ia), (Ib), and (Ig) are preferred, and general formulas (Ia) and (Ig) are more preferred. General formula (Ia) is even more preferred to achieve a good balance of improved response rate, reduced image-sticking, and reduced drop marks. General formula (Ib) is also preferred if fast response rates are desired. General formulas (Ib), (Ie), (If), and (Ih) are preferred if fast response rates are more desired. General formulas (Ie) and (If), which are dialkenyl compounds, are preferred if fast response rates are even more desired.

In view of this, the compounds represented by general formulas (Ia) and (Ig) above are preferably present in an amount of 50% by mass or more, more preferably 70% by mass or more, even more preferably 80% by mass or more, most preferably 100% by mass, of all compounds represented by general formula (I) above. The compound represented by general formula (Ia) above is preferably present in an amount of 50% by mass or more, more preferably 70% by mass or more, even more preferably 80% by mass or more, of all compounds represented by general formula (I) above.

The liquid crystal composition according to the present invention preferably contains, as a second component, a compound represented by general formula (II) below.

[Chem. 16]

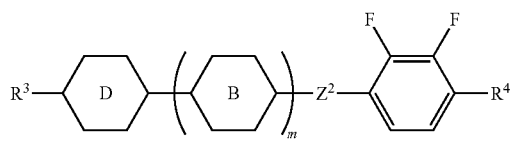
(II)

In the formula, $R^3$ is an alkyl group of 1 to 8 carbon atoms, an alkenyl group of 2 to 8 carbon atoms, an alkoxy group of 1 to 8 carbon atoms, or an alkenyloxy group of 2 to 8 carbon atoms; $R^4$ is an alkyl group of 1 to 8 carbon atoms, an alkenyl group of 4 to 8 carbon atoms, an alkoxy group of 1 to 8 carbon atoms, or an alkenyloxy group of 3 to 8 carbon atoms; B and D are each independently 1,4-phenylene or trans-1,4-cyclohexylene; $Z^2$ is a single bond, —OCH$_2$—, —OCO—, —CH$_2$O—, or —COO—; and m is 0, 1, or 2, where if m is 2, each B may be the same or different.

In the formula, m is preferably 1 or 2.

Specific compounds represented by general formula (II) where m is 1 include compounds represented by general formulas (II-1), (II-1'), and (II-2) below.

[Chem. 17]

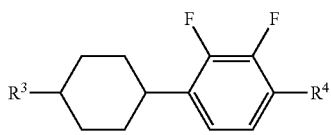
(II-1)

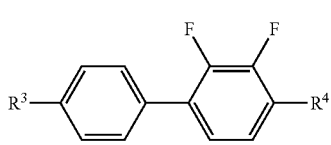
(II-2)

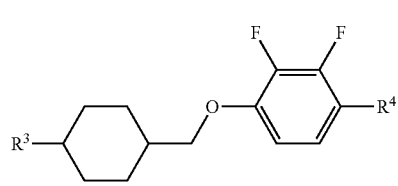
(II-1')

In each formula, $R^3$ is an alkyl group of 1 to 8 carbon atoms, an alkenyl group of 2 to 8 carbon atoms, an alkoxy group of 1 to 8 carbon atoms, or an alkenyloxy group of 2 to 8 carbon atoms; and $R^4$ is an alkyl group of 1 to 8 carbon atoms, an alkenyl group of 4 to 8 carbon atoms, an alkoxy group of 1 to 8 carbon atoms, or an alkenyloxy group of 3 to 8 carbon atoms.

Although $R^3$ in general formulas (II-1) and (II-2) above is an alkyl group of 1 to 8 carbon atoms, an alkenyl group of 2 to 8 carbon atoms, an alkoxy group of 1 to 8 carbon atoms, or an alkenyloxy group of 2 to 8 carbon atoms, $R^3$ is preferably an alkyl group of 1 to 5 carbon atoms or an alkenyl group of 2 to 5 carbon atoms, more preferably an alkyl group of 2 to 5 carbon atoms or an alkenyl group of 2 to 4 carbon atoms, even more preferably an alkyl group of 3 to 5 carbon atoms or an alkenyl group of 2 carbon atoms, further preferably an alkyl group of 3 carbon atoms.

Although $R^4$ in general formulas (II-1) and (II-2) above is an alkyl group of 1 to 8 carbon atoms, an alkenyl group of 4 to 8 carbon atoms, an alkoxy group of 1 to 8 carbon atoms, or an alkenyloxy group of 3 to 8 carbon atoms, $R^4$ is preferably an alkyl group of 1 to 5 carbon atoms or an alkoxy group of 1 to 5 carbon atoms, more preferably an alkyl group of 1 to 3 carbon atoms or an alkoxy group of 1 to 3 carbon atoms, even more preferably an alkyl group of 3 carbon atoms or an alkoxy group of 2 carbon atoms, further preferably an alkoxy group of 2 carbon atoms.

Specific preferred compounds represented by general formulas (II-1) and (II-2) above include compounds represented by general formulas (II-1a) and (II-1b) below.

[Chem. 18]

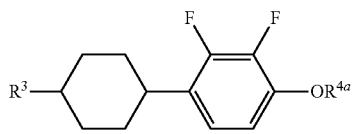
(II-1a)

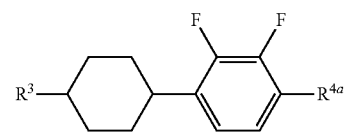
(II-1b)

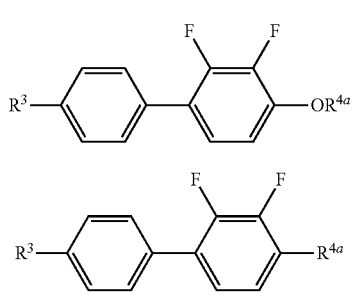

In each formula, $R^3$ is an alkyl group of 1 to 5 carbon atoms or an alkenyl group of 2 to 5 carbon atoms, and $R^{4a}$ is an alkyl group of 1 to 5 carbon atoms.

In general formula (II-1a) above, $R^{4a}$ is preferably an alkyl group of 1 to 3 carbon atoms, more preferably an alkyl group of 1 or 2 carbon atoms, even more preferably an alkyl group of 2 carbon atoms.

In general formula (II-1b) above, $R^{4a}$ is preferably an alkyl group of 1 to 3 carbon atoms, more preferably an alkyl group of 1 or 3 carbon atoms, even more preferably an alkyl group of 3 carbon atoms.

Among general formulas (II-1a) and (II-1b) above, general formula (II-1a) is preferred to achieve a larger absolute value of dielectric anisotropy.

In general formula (II-2a) above, $R^{4a}$ is preferably an alkyl group of 1 to 3 carbon atoms, more preferably an alkyl group of 1 or 2 carbon atoms, even more preferably an alkyl group of 2 carbon atoms.

In general formula (II-2b) above, $R^{4a}$ is preferably an alkyl group of 1 to 3 carbon atoms, more preferably an alkyl group of 1 or 3 carbon atoms, even more preferably an alkyl group of 3 carbon atoms.

Among general formulas (II-2a) and (II-2b) above, general formula (II-2a) is preferred to achieve a larger absolute value of dielectric anisotropy.

Compounds represented by general formulas (II-1) and (II-2) are preferably present in the liquid crystal composition according to the present invention in an amount of 5% to 30% by mass, more preferably 10% to 25% by mass, even more preferably 12% to 20% by mass.

Specific compounds represented by general formula (II) where m is 1 include compounds represented by general formula (II-3) below.

[Chem. 19]

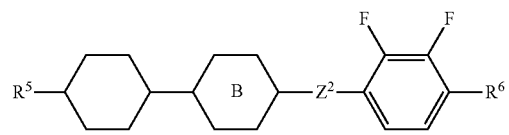

In the formula, $R^5$ is an alkyl group of 1 to 8 carbon atoms, an alkenyl group of 2 to 8 carbon atoms, an alkoxy group of 1 to 8 carbon atoms, or an alkenyloxy group of 2 to 8 carbon atoms; $R^6$ is an alkyl group of 1 to 8 carbon atoms, an alkenyl group of 4 to 8 carbon atoms, an alkoxy group of 1 to 8 carbon atoms, or an alkenyloxy group of 3 to 8 carbon atoms; B is 1,4-phenylene or trans-1,4-cyclohexylene; and $Z^2$ is a single bond, —OCH$_2$—, —OCO—, —CH$_2$O—, or —COO—.

Although $R^5$ in general formula (II-3) above is an alkyl group of 1 to 8 carbon atoms, an alkenyl group of 2 to 8 carbon atoms, an alkoxy group of 1 to 8 carbon atoms, or an alkenyloxy group of 2 to 8 carbon atoms, $R^5$ is preferably an alkyl group of 1 to 5 carbon atoms or an alkenyl group of 2 to 5 carbon atoms, more preferably an alkyl group of 2 to 5 carbon atoms or an alkenyl group of 2 to 4 carbon atoms, even more preferably an alkyl group of 3 to 5 carbon atoms or an alkenyl group of 2 carbon atoms, further preferably an alkyl group of 3 carbon atoms.

Although $R^6$ in general formula (II-3) above is an alkyl group of 1 to 8 carbon atoms, an alkenyl group of 4 to 8 carbon atoms, an alkoxy group of 1 to 8 carbon atoms, or an alkenyloxy group of 3 to 8 carbon atoms, $R^6$ is an alkyl group of 1 to 5 carbon atoms or an alkoxy group of 1 to 5 carbon atoms, more preferably an alkyl group of 1 to 3 carbon atoms or an alkoxy group of 1 to 3 carbon atoms, even more preferably an alkyl group of 3 carbon atoms or an alkoxy group of 2 carbon atoms, further preferably an alkoxy group of 2 carbon atoms.

Although B in general formula (II-3) above is optionally fluorinated 1,4-phenylene or trans-1,4-cyclohexylene, B is preferably unsubstituted 1,4-phenylene or trans-1,4-cyclohexylene, more preferably trans-1,4-cyclohexylene.

Although $Z^2$ in general formula (II-3) above is a single bond, —OCH$_2$—, —OCO—, —CH$_2$O—, or —COO—, $Z^2$ is preferably a single bond or —CH$_2$O—, more preferably a single bond.

Specific compounds represented by general formula (II-3) above include compounds represented by general formulas (II-3a) to (II-3f) below.

[Chem. 20]

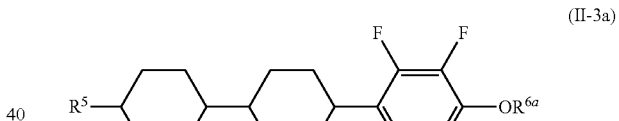

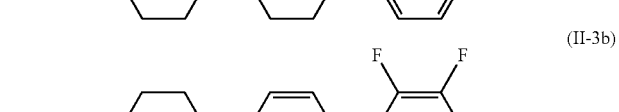

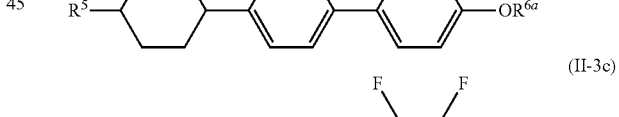

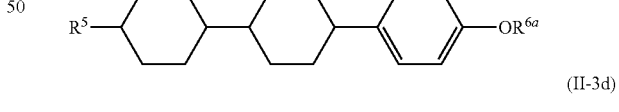

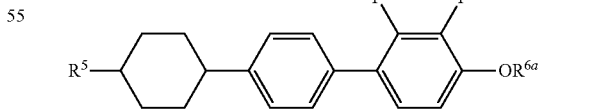

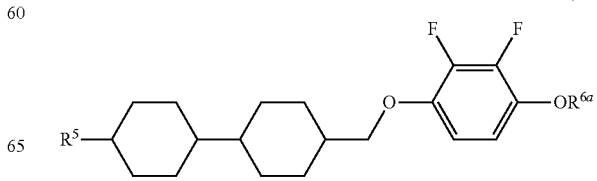

-continued (II-3f)

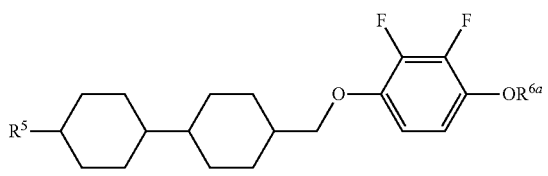

In each formula, $R^5$ is an alkyl group of 1 to 5 carbon atoms or an alkenyl group of 2 to 5 carbon atoms, preferably as defined for $R^5$ in general formula (II-3), and $R^{6a}$ is an alkyl group of 1 to 5 carbon atoms, preferably as defined for $R^6$ in general formula (II-3).

In general formulas (II-3a) to (II-3f) above, $R^5$ is preferably as defined for $R^5$ in general formula (II-3).

In general formulas (II-3a) to (II-3f) above, $R^{6a}$ is an alkyl group of 1 to 3 carbon atoms, more preferably an alkyl group of 1 or 2 carbon atoms, even more preferably an alkyl group of 2 carbon atoms.

Among general formulas (II-3a) to (II-3f) above, general formulas (II-3a) and (II-3e) are preferred to achieve a larger absolute value of dielectric anisotropy, and general formula (II-3b) is preferred for compositions of large Δn.

Compounds represented by general formula (II-3) are preferably present in the liquid crystal composition according to the present invention in an amount of 20% to 45% by mass, more preferably 25% to 40% by mass, even more preferably 28% to 38% by mass.

The liquid crystal composition according to the present invention may further contain, as a third component, a compound represented by general formula (III) below.

[Chem. 21]

(III)

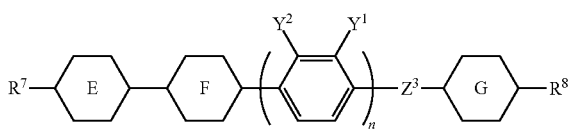

In the formula, $R^7$ and $R^8$ are each independently an alkyl group of 1 to 8 carbon atoms, an alkenyl group of 2 to 8 carbon atoms, an alkoxy group of 1 to 8 carbon atoms, or an alkenyloxy group of 2 to 8 carbon atoms; $Y^1$ and $Y^2$ and each independently hydrogen or fluorine; E, F, and G are each independently 1,4-phenylene or trans-1,4-cyclohexylene; $Z^3$ is a single bond, —OCH$_2$—, —OCO—, —CH$_2$O—, or —COO—; and n is 0 or 1.

In general formula (III) above, $R^7$ is an alkyl group of 1 to 8 carbon atoms, an alkenyl group of 2 to 8 carbon atoms, an alkoxy group of 1 to 8 carbon atoms, or an alkenyloxy group of 2 to 8 carbon atoms.

If E is trans-1,4-cyclohexylene, $R^7$ is preferably an alkyl group of 1 to 5 carbon atoms or an alkenyl group of 2 to 5 carbon atoms, more preferably an alkyl group of 2 to 5 carbon atoms or an alkenyl group of 2 to 4 carbon atoms, even more preferably an alkyl group of 3 to 5 carbon atoms or an alkenyl group of 2 carbon atoms, further preferably an alkyl group of 3 carbon atoms.

If E is optionally fluorinated 1,4-phenylene, $R^7$ is preferably an alkyl group of 1 to 5 carbon atoms or an alkenyl group of 4 or 5 carbon atoms, more preferably an alkyl group of 2 to 5 carbon atoms or an alkenyl group of 4 carbon atoms, even more preferably an alkyl group of 2 to 4 carbon atoms.

In general formula (III) above, $R^8$ is an alkyl group of 1 to 8 carbon atoms, an alkenyl group of 4 to 8 carbon atoms, an alkoxy group of 1 to 8 carbon atoms, or an alkenyloxy group of 3 to 8 carbon atoms.

If G is trans-1,4-cyclohexylene, $R^8$ is preferably an alkyl group of 1 to 5 carbon atoms or an alkenyl group of 2 to 5 carbon atoms, more preferably an alkyl group of 2 to 5 carbon atoms or an alkenyl group of 2 to 4 carbon atoms, even more preferably an alkyl group of 3 to 5 carbon atoms or an alkenyl group of 2 carbon atoms, further preferably an alkyl group of 3 carbon atoms.

If G is optionally fluorinated 1,4-phenylene, $R^8$ is preferably an alkyl group of 1 to 5 carbon atoms or an alkenyl group of 4 or 5 carbon atoms, more preferably an alkyl group of 2 to 5 carbon atoms or an alkenyl group of 4 carbon atoms, even more preferably an alkyl group of 2 to 4 carbon atoms.

If $R^7$ or $R^8$ in general formula (III) above is an alkenyl group and F or G, to which $R^7$ or $R^8$ is linked, is optionally fluorinated 1,4-phenylene, the alkenyl groups of 4 or 5 carbon atoms represented by the following formulas are preferred.

[Chem. 22]

In each formula, the right end is linked to the cyclic structure.

In this case, the alkenyl group of 4 carbon atoms is more preferred.

Although $Y^1$ and $Y^2$ in general formula (III) above are each independently hydrogen or fluorine, at least one of $Y^1$ and $Y^2$ is preferably fluorine. Both $Y^1$ and $Y^2$ are preferably fluorine if large absolute values of dielectric anisotropy are desired.

Although E, F, and G in general formula (III) above are each independently optionally fluorinated 1,4-phenylene or trans-1,4-cyclohexylene, E, F, and G are preferably unsubstituted 1,4-phenylene or trans-1,4-cyclohexylene.

Although $Z^2$ in general formula (III) above is a single bond, —OCH$_2$—, —OCO—, —CH$_2$O—, or —COO—, $Z^2$ is preferably a single bond, —CH$_2$O—, or —COO—, more preferably a single bond.

Although n in general formula (III) above is 0 or 1, n is preferably 0 if $Z^3$ is a substituent, rather than a single bond.

Specific preferred compounds represented by general formula (III) above where n is 0 include compounds represented by general formulas (III-1a) to (III-1h) below.

[Chem. 23]

(III-1a)

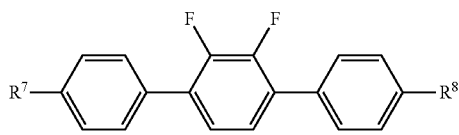

(III-1b)

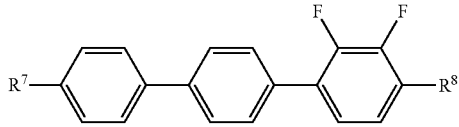

-continued (III-1c)
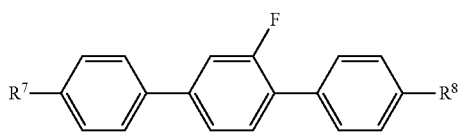

(III-1d)
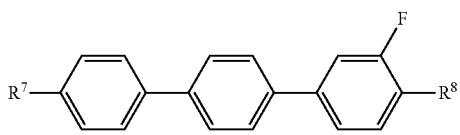

(III-1e)
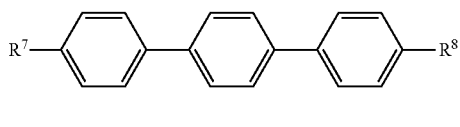

(III-1f)
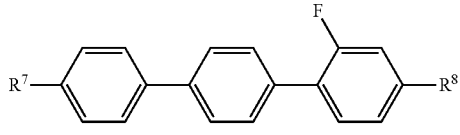

(III-1g)
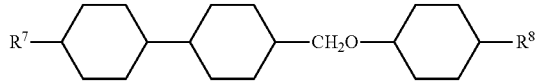

(III-1h)
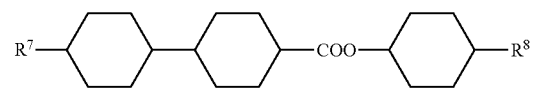

In each formula, $R^7$ and $R^8$ are each independently an alkyl group of 1 to 5 carbon atoms, an alkenyl group of 2 to 5 carbon atoms, or an alkoxy group of 1 to 5 carbon atoms, preferably as defined for $R^7$ and $R^8$ in general formula (III).

Specific preferred compounds represented by general formula (III) above where n is 1 include compounds represented by general formulas (III-2a) to (III-2i) below.

[Chem. 24]

(III-2a)
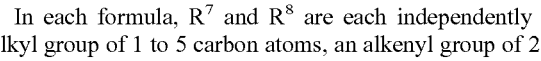

(III-2b)
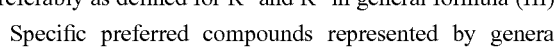

(III-2c)

(III-2d)
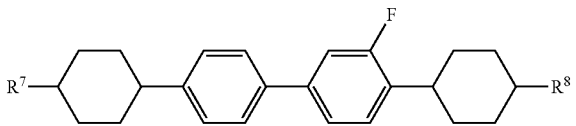

(III-2e)
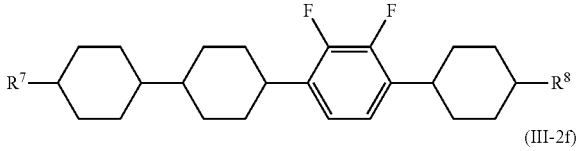

(III-2f)
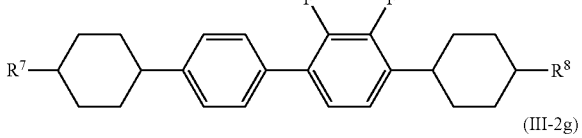

(III-2g)
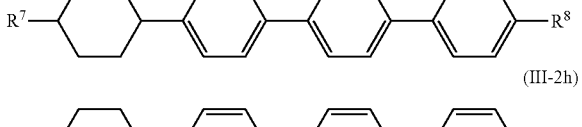

(III-2h)
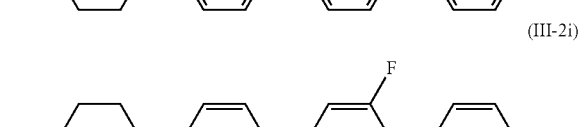

(III-2i)
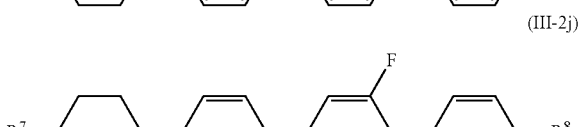

(III-2j)
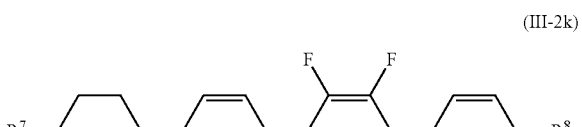

(III-2k)
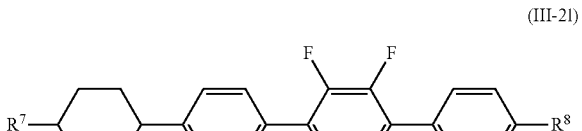

(III-2l)
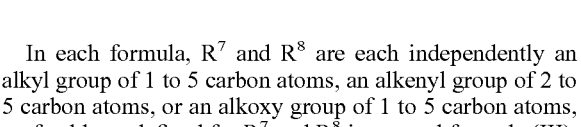

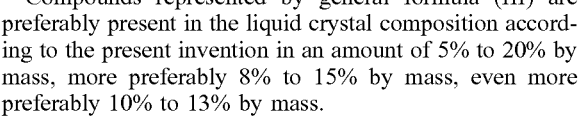

In each formula, $R^7$ and $R^8$ are each independently an alkyl group of 1 to 5 carbon atoms, an alkenyl group of 2 to 5 carbon atoms, or an alkoxy group of 1 to 5 carbon atoms, preferably as defined for $R^7$ and $R^8$ in general formula (III).

Compounds represented by general formula (III) are preferably present in the liquid crystal composition according to the present invention in an amount of 5% to 20% by mass, more preferably 8% to 15% by mass, even more preferably 10% to 13% by mass.

The liquid crystal composition according to the present invention contains a combination of compounds represented by general formulas (I) to (III) above. These compounds are preferably present in the following amounts.

Compounds represented by general formulas (II-1), (II-2), and (II-1') above, which have a relatively large absolute value of negative dielectric anisotropy, are preferably present in the liquid crystal composition in a total amount of 30% to 65% by mass, more preferably 40% to 55% by mass, even more preferably 43% to 50% by mass.

Compounds represented by general formula (III) above include both compounds having positive dielectric anisotropy and compounds having negative dielectric anisotropy. If compounds having an absolute value of negative dielectric anisotropy of 0.3 or more are used, compounds represented by general formulas (II-1), (II-2), (II-1'), and (III) are preferably present in the liquid crystal composition in a total amount of 35% to 70% by mass, more preferably 45% to 65% by mass, even more preferably 50% to 60% by mass.

The liquid crystal composition according to the present invention preferably contains compounds represented by general formula (I) above in an amount of 30% to 50% by mass and compounds represented by general formulas (II-1), (II-2), (II-1'), and (III) in an amount of 35% to 70% by mass.

More preferably, the liquid crystal composition according to the present invention contains compounds represented by general formula (I) above in an amount of 35% to 45% by mass and compounds represented by general formulas (II-1), (II-2), (II-1'), and (III) in an amount of 45% to 65% by mass.

Even more preferably, the liquid crystal composition according to the present invention contains compounds represented by general formula (I) above in an amount of 38% to 42% by mass and compounds represented by general formulas (II-1), (II-2), (II-1'), and (III) in an amount of 50% to 60% by mass.

Compounds represented by general formulas (II-1), (II-2), (II-1'), and (III) are preferably present in a total amount of 80% to 100% by mass, more preferably 90% to 100% by mass, even more preferably 95% to 100% by mass, of the total liquid crystal composition.

The liquid crystal composition according to the present invention can have a wide range of nematic phase-isotropic liquid phase transition temperatures (Tni). Preferably, the liquid crystal composition according to the present invention has a nematic phase-isotropic liquid phase transition temperature (Tni) of 60° C. to 120° C., more preferably 70° C. to 100° C., even more preferably 70° C. to 85° C.

The liquid crystal composition according to the present invention preferably has a dielectric anisotropy at 25° C. of −2.0 to −6.0, more preferably −2.5 to −5.0, even more preferably −2.5 to −3.5.

The liquid crystal composition according to the present invention preferably has a refractive index anisotropy at 25° C. of 0.08 to 0.13, more preferably 0.09 to 0.12.

Specifically, the liquid crystal composition according to the present invention preferably has a refractive index anisotropy at 25° C. of 0.10 to 0.12 for small cell gaps and 0.08 to 0.10 for large cell gaps.

Method for Manufacturing Liquid Crystal Display Device

A method for manufacturing the liquid crystal display device according to the present invention will now be described with reference to FIG. 1.

The vertical alignment layers 16 and 17 are formed by applying an alignment material containing reactive-group-containing polymerizable compounds and a vertical alignment material to the surface of the first substrate 11 on which the common electrode 14 is formed and to the surface of the second substrate 12 on which the pixel electrodes 15 are formed and then heating the alignment material.

The alignment material is first prepared. The alignment material contains a polymer compound precursor (polymerizable compound) that forms a first polymer compound, polymerizable compounds represented by general formulas (VI) and (V) above, and optionally a photopolymerizable and photocrosslinkable compound.

If the first polymer compound is a polyimide, the polymer compound precursor may be, for example, a mixture of tetracarboxylic dianhydride and a diisocyanate, a polyamic acid, or a solution or dispersion of a polyimide in a solvent. The polyimide is preferably present in the polyimide solution or dispersion in an amount of 1% to 10% by mass, more preferably 3% to 5% by mass.

If the first polymer compound is a polysiloxane, the polymer compound precursor may be, for example, a solution, in a solvent, of a polysiloxane synthesized by heating a mixture of an alkoxy-containing silicon compound, a halogenated-alkoxy containing silicon compound, an alcohol, and oxalic acid in a predetermined ratio.

The alignment material may optionally contain other materials such as photocrosslinkable compounds, photoinitiators, and solvents.

After the preparation of the alignment material, the alignment material is applied or printed on the first substrate 11 and the second substrate 12 so as to cover the common electrode 14, the pixel electrodes 15, and the slits thereof (not shown), followed by processes such as heating. This results in the polymer compound precursor present in the applied or printed alignment material being polymerized and cured to form a first polymer compound. The vertical alignment layers 16 and 17 are thus formed, which contain the first polymer compound and the polymerizable compounds.

If the alignment material is heated, it is preferably heated at 80° C. or higher, more preferably 150° C. to 200° C.

Alignment control portions containing the first polymer compound are formed in this step, optionally followed by processes such as rubbing.

The first substrate 11 and the second substrate 12 are then stacked on top of each other, and a liquid crystal composition layer 13 containing liquid crystal molecules is sealed therebetween.

Specifically, spacer protrusions, such as plastic beads, for providing the cell gap are dispersed either on the vertical alignment layer 16 formed on the first substrate 11 or on the vertical alignment layer 17 formed on the second substrate 12. A sealant such as epoxy adhesive is then printed, for example, by screen printing.

The first substrate 11 and the second substrate 12 are then stacked on top of each other such that the vertical alignment layers 16 and 17 face each other with the spacer protrusions and the sealant therebetween, and a liquid crystal composition containing liquid crystal molecules is injected therebetween.

The sealant is then cured by processes such as heating to seal the liquid crystal composition between the first substrate 11 and the second substrate 12.

A voltage is then applied across the common electrode 14 and the pixel electrodes 15 by means for applying a voltage. The voltage applied is, for example, 5 to 30 V. This generates an electric field at a predetermined angle to the surface of the first substrate 11 adjacent to the liquid crystal composition layer 13 (facing the liquid crystal composition layer 13) and the surface of the second substrate 12 adjacent to the liquid crystal composition layer 13 (facing the liquid crystal composition layer 13). This electric field tilts liquid crystal molecules 19 at a predetermined angle to the direction normal to the first substrate 11 and the second substrate 12. The tilt angle of the liquid crystal molecules 19 is nearly equal to the pretilt θ to be induced to the liquid crystal molecules 19 in the subsequent step. The pretilt θ of the liquid crystal molecules 19 can thus be controlled depending on the voltage (see FIG. 3).

While the voltage is being applied, the liquid crystal composition layer 13 is irradiated with ultraviolet light UV, for example, through the first substrate 11. The ultraviolet light UV polymerizes the polymerizable compounds present in the vertical alignment layers 16 and 17 to form a second polymer compound.

The intensity of the ultraviolet light UV for irradiation may or may not be constant. If the irradiation intensity changes, each irradiation intensity may be maintained for any period of time. If two or more irradiation steps are employed, the irradiation intensity is preferably lower in the second and subsequent irradiation steps than in the first irradiation step. The total irradiation time is preferably longer in the second and subsequent irradiation steps than in the first irradiation step. The total dose is preferably larger in the second and subsequent irradiation steps than in the first irradiation step. If the irradiation intensity is discontinuously changed, the average irradiation intensity is preferably higher in the first half of the entire irradiation process than in the second half of the entire irradiation process. More preferably, the intensity is highest immediately upon starting irradiation. Even more preferably, the irradiation intensity continues to decrease to a certain level over time. The intensity of the ultraviolet light UV is preferably 2 to 100 mW/cm$^{-2}$. More preferably, the intensity in the first step of the multistep irradiation process or the maximum irradiation intensity over the entire irradiation process where the irradiation intensity is discontinuously changed is preferably 10 to 100 mW/cm$^{-2}$, and the intensity in the second and subsequent steps of the multistep irradiation process or the minimum irradiation intensity over the entire irradiation process where the irradiation intensity is discontinuously changed is 2 to 50 mW/cm$^{-2}$. The total dose is preferably 10 to 300 J, more preferably 50 to 250 J, even more preferably 100 to 250 J.

The voltage applied may be either alternating current or direct current.

As a result, alignment-limiting portions (not shown) are formed. The alignment-limiting portions are combined with the alignment control portions of the vertical alignment layers 16 and 17 and contain the second polymer compound. In a non-operating state, the alignment-limiting portions function to induce the pretilt θ to the liquid crystal molecules 19 located near the interfaces between the liquid crystal composition layer 13 and the vertical alignment layers 16 and 17. Although the liquid crystal composition layer 13 in this example is irradiated with the ultraviolet light UV through the first substrate 11, it may instead be irradiated with the ultraviolet light UV through the second substrate 12 or through both the first substrate 11 and the second substrate 12.

As discussed above, the liquid crystal molecules 19 in the liquid crystal composition layer 13 of the liquid crystal display device according to the present invention have a predetermined pretilt θ. The pretilt θ is preferably 89° to 89.9°, more preferably 89.5° to 89.9°. The term "substantially perpendicularly" encompasses both the state where liquid crystal molecules are oriented in the perpendicular direction and the state where liquid crystal molecules are pretilted from the perpendicular direction. The liquid crystal display device according to the present invention and a liquid crystal display apparatus including the liquid crystal display device provide a significantly faster rate of response to drive voltage than those without a pretilt.

The polymer compound precursor that forms the vertical alignment layers 16 and 17 in the liquid crystal display device according to the present invention is preferably a non-photosensitive polyimide precursor.

The polymerizable compounds, particularly those represented by general formulas (VI) and (V) above, are preferably present in the polymer compound precursor in a total amount of 0.5% to 4% by mass, more preferably 1% to 2% by mass.

EXAMPLES

The present invention is further illustrated by the following examples and comparative examples, although these examples are not intended to limit the invention. In the compositions of the examples and comparative examples below, percentages are by mass.

In the examples and comparative examples below, Tni, Δn, Δ∈, η, and $γ_1$ are defined as follows.

$T_{ni}$: nematic phase-isotropic liquid phase transition temperature (° C.)

Δn: refractive index anisotropy at 25° C.

Δ∈: dielectric anisotropy at 25° C.

η: viscosity at 20° C. (mPa·s)

$γ_1$: rotational viscosity at 25° C. (mPa·s)

In the examples and comparative examples below, liquid crystal display devices were evaluated for image-sticking and drop marks by the following methods.

Image-Sticking

The liquid crystal display devices were evaluated for image-sticking as follows. After a predetermined fixed pattern was displayed within the display area for 1,000 hours, a uniform image was displayed over the entire screen and was visually inspected for image-sticking of the fixed pattern. The liquid crystal display devices were rated on the following four-level scale:

A: no image-sticking

B: slight but acceptable image-sticking

C: unacceptable image-sticking

D: severe image-sticking

Drop Marks

The liquid crystal display devices were evaluated for drop marks as follows. A black image was displayed over the entire screen and was visually inspected for white drop marks. The liquid crystal display devices were rated on the following four-level scale:

A: no image-sticking

B: slight but acceptable image-sticking

C: unacceptable image-sticking

D: severe image-sticking

The compounds used in the examples are denoted by the following abbreviations:

Side Chains

-n: —$C_nH_{2n+1}$ (linear alkyl group of n carbon atoms).

—On: —$OC_nH_{2+1}$ (linear alkoxy group of n carbon atoms).

Cyclic Structures

[Chem. 25]

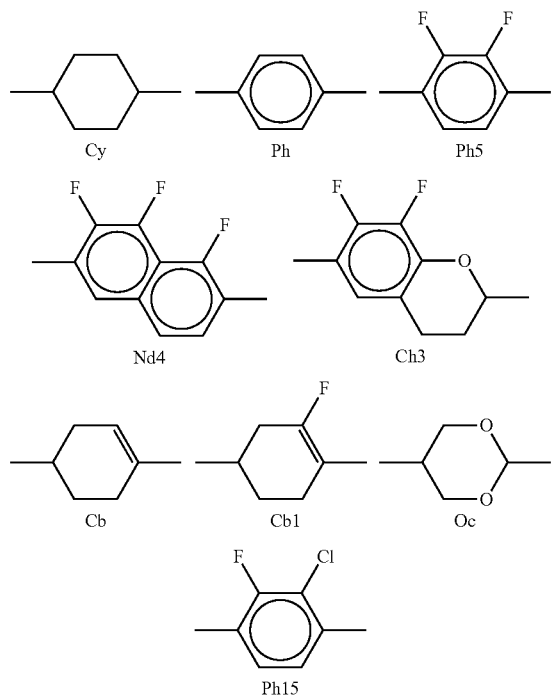

[Chem. 26]

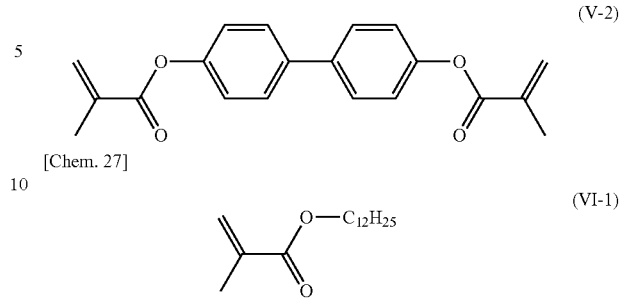

[Chem. 27]

A liquid crystal composition containing the compounds represented by the following chemical formulas was placed between the vertical alignment layers formed on the common electrode substrate and the pixel electrode substrate. The liquid crystal composition was sealed between the two substrates by curing a sealant to form a liquid crystal composition layer. The thickness of the liquid crystal composition layer was controlled to 4 μm with spacers having a thickness of 4 μm.

Among the compounds represented by the following chemical formulas, those belonging to group (I) are compounds represented by general formula (I) above, and those belonging to group (II) are compounds represented by general formula (II) above.

[Chem. 28]

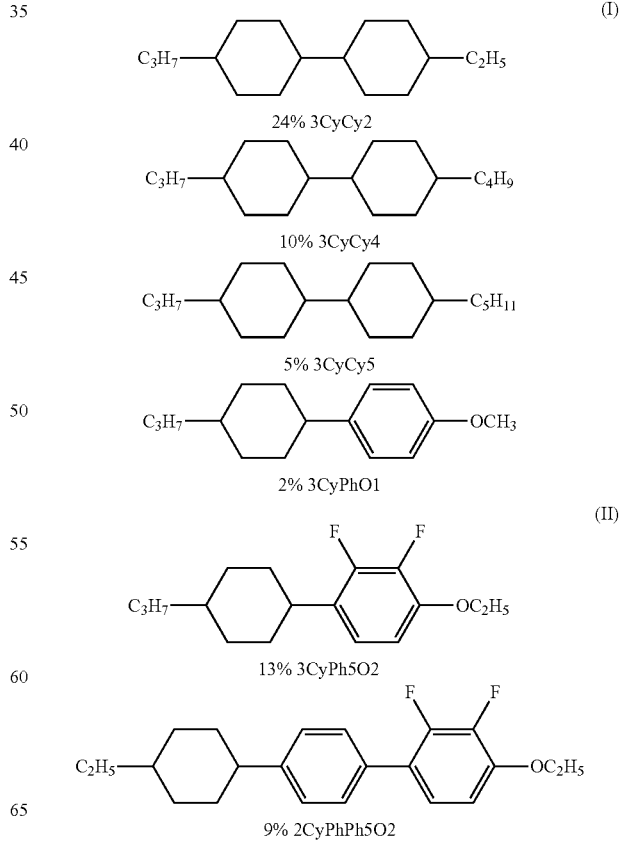

Example 1

A first substrate (common electrode substrate) and a second substrate (pixel electrode substrate) were fabricated. The first substrate had a transparent electrode layer forming a transparent common electrode and a color filter layer. The second substrate had a pixel electrode layer including transparent pixel electrodes that were driven by active elements.

The pixel electrodes were formed on the pixel electrode substrate by etching an ITO film such that the pixel electrodes had slits, where no electrode was present, for orienting liquid crystal molecules in different directions.

A vertical alignment layer material containing a polyimide precursor and reactive-group-containing polymerizable compounds was applied to the common electrode substrate and the pixel electrode substrate by spin coating. The resulting coating was heated at 200° C. to cure the polyimide precursor in the vertical alignment layer material, thus forming a vertical alignment layer with a thickness of 100 nm on each substrate. The reactive-group-containing polymerizable compounds present in the vertical alignment layers were not cured in this step.

The vertical alignment layer material used was a polyimide solution containing 3% of a polyimide precursor (JALS2131-R6, JSR Corporation) and also containing 2% of a reactive-group-containing polymerizable compound represented by formula (V-2) below and 1% of a reactive-group-containing polymerizable compound represented by formula (VI-1) below.

-continued

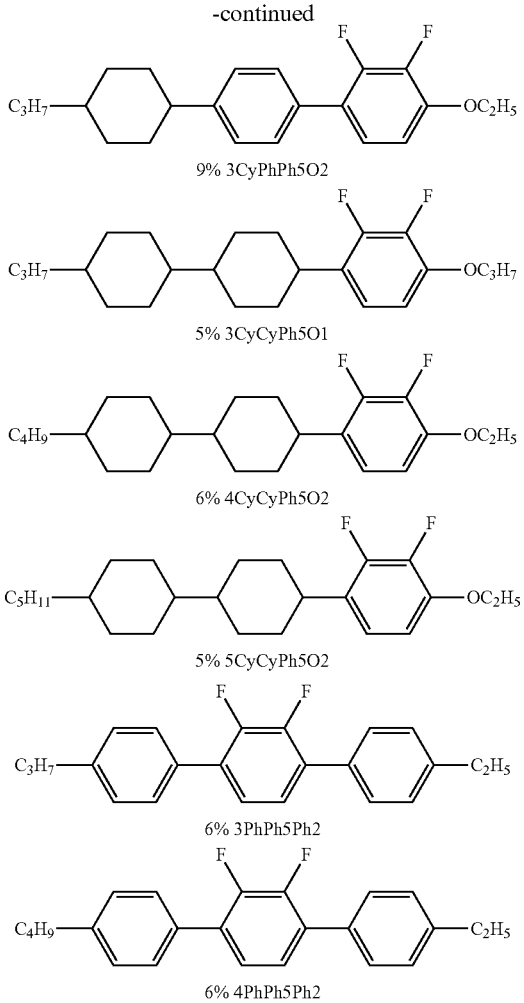

9% 3CyPhPh5O2

5% 3CyCyPh5O1

6% 4CyCyPh5O2

5% 5CyCyPh5O2

6% 3PhPh5Ph2

6% 4PhPh5Ph2

The resulting liquid crystal display device was irradiated with ultraviolet radiation under the application of a rectangular alternating electric field to cure the reactive-group-containing polymerizable compounds. Specifically, the liquid crystal display device was irradiated with ultraviolet radiation at 20 mW for 10 minutes using a UIS-S2511RZ irradiation system available from Usio Inc. equipped with a USH-250BY ultraviolet lamp available from Usio Inc. to obtain a liquid crystal display device of Example 1. By this step, vertical alignment layers containing a polymer of the reactive-group-containing polymerizable compounds were formed to induce a pretilt angle to the liquid crystal molecules in the liquid crystal composition layer.

The pretilt angle is defined as shown in FIG. 3. The pretilt angle (θ) is 90° for perfect vertical alignment and is less than 90° after a pretilt angle is induced.

In the liquid crystal display device of Example 1, the pretilt angle was induced in different directions in four domains along the slits in the pixel electrodes as shown in FIG. 2. After the curing of the polymerizable compounds, the pretilt angle was maintained without applying an alternating electric field. The maintained pretilt angle was 87°.

As shown in Table 1, the thus-fabricated liquid crystal display device of Example 1 had fast response rate, few drop marks, and good image-sticking characteristics.

TABLE 1

| | |
|---|---|
| $T_{NI}$/° C. | 81.0 |
| Δn | 0.103 |
| $n_o$ | 1.483 |
| $\varepsilon_{//}$ | 3.3 |
| $\varepsilon_{\perp}$ | 6.2 |
| Δε | −2.9 |
| η/mPa · s | 20.3 |
| $\gamma_1$/mPa · s | 112 |
| $\gamma_1/\Delta n^2 \times 10^{-2}$ | 104 |
| Drop mark evaluation | A |
| Image-sticking evaluation | A |
| Response rate/ms | 8.0 |

Comparative Example 1

A liquid crystal display device of Comparative Example 1 was fabricated as in Example 1 except that a liquid crystal composition containing the compounds represented by the following chemical formulas was prepared and used.

[Chem. 29]

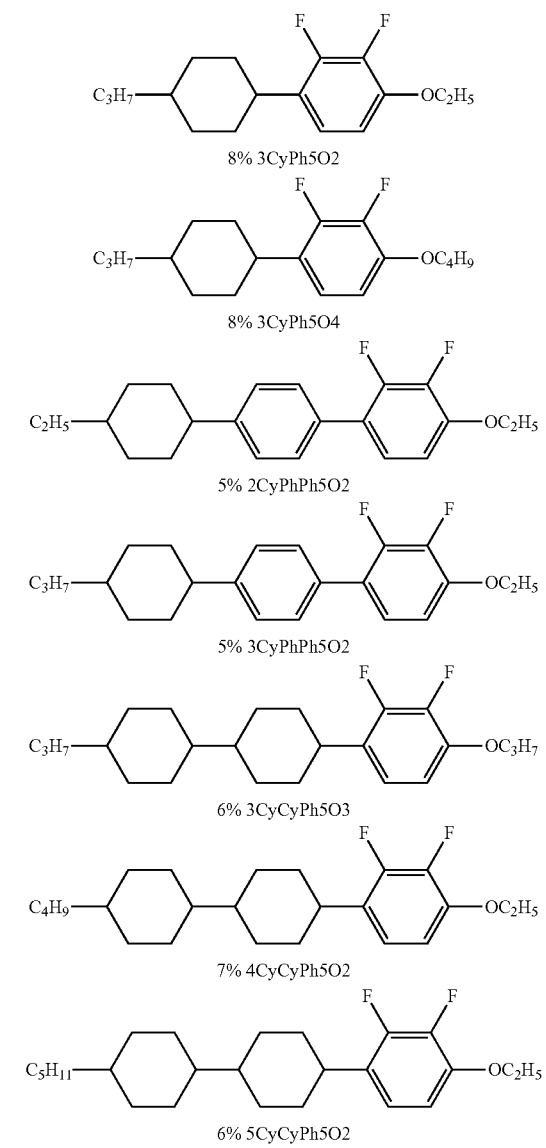

8% 3CyPh5O2

8% 3CyPh5O4

5% 2CyPhPh5O2

5% 3CyPhPh5O2

6% 3CyCyPh5O3

7% 4CyCyPh5O2

6% 5CyCyPh5O2

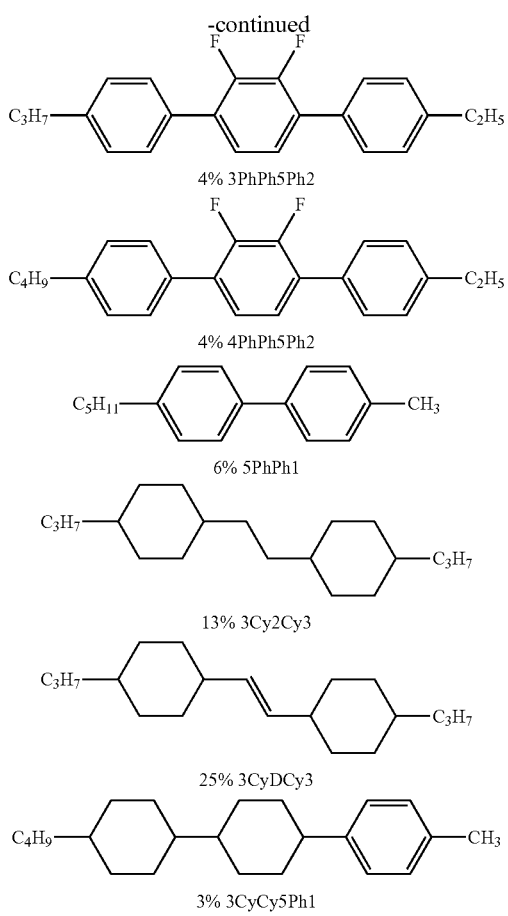

The liquid crystal display device of Comparative Example 1 was tested for image-sticking and drop marks by the same methods as in Example 1. The results are shown in Table 2.

The results show that the liquid crystal composition prepared in Comparative Example 1 gave worse results than the liquid crystal composition prepared in Example 1. The liquid crystal composition prepared in Comparative Example 1 also had a slower response rate than the liquid crystal composition prepared in Example 1.

TABLE 2

| | |
|---|---|
| $T_{NI}/°C.$ | 80.2 |
| $\Delta n$ | 0.104 |
| $n_o$ | 1.481 |
| $\varepsilon_{//}$ | 3.1 |
| $\varepsilon_\perp$ | 6.0 |
| $\Delta\varepsilon$ | -3.0 |
| $\eta/mPa \cdot s$ | 19.6 |
| $\gamma_1/mPa \cdot s$ | 143 |
| $\gamma_1/\Delta n^2 \times 10^{-2}$ | 131 |
| Drop mark evaluation | C |
| Image-sticking evaluation | D |
| Response rate/ms | 10.9 |

Comparative Example 2

A liquid crystal display device of Comparative Example 2 was fabricated as in Example 1 except that a liquid crystal composition having the composition shown in Table 3 was prepared and used.

TABLE 3

| | |
|---|---|
| $T_{NI}/°C.$ | 80.5 |
| $\Delta n$ | 0.103 |
| $n_o$ | 1.479 |
| $\varepsilon_{//}$ | 3.1 |
| $\varepsilon_\perp$ | 6.2 |
| $\Delta\varepsilon$ | -3.0 |
| $\eta/mPa \cdot s$ | 18.5 |
| $\gamma_1/mPa \cdot s$ | 132 |
| $\gamma_1/\Delta n^2 \times 10^{-2}$ | 125 |
| 3CyPh5O2 | 9% |
| 3CyPh5O4 | 9% |
| 2CyPhPh5O2 | 4% |
| 3CyPhPh5O2 | 4% |
| 3CyCyPh5O3 | 7% |
| 4CyCyPh5O2 | 7% |
| 5CyCyPh5O2 | 7% |
| 3PhPh5Ph2 | 3% |
| 4PhPh5Ph2 | 3% |
| 5PhPh1 | 3% |
| 3Cy2Cy3 | 15% |
| 3CyDCy3 | 25% |
| 0d3PhTPh3d0 | 2% |
| 3CyPhTPh2 | 2% |
| Drop mark evaluation | D |
| Image-sticking evaluation | C |
| Response rate/ms | 10.2 |

The liquid crystal display device of Comparative Example 2 was tested for image-sticking and drop marks by the same methods as in Example 1. The results are shown in Table 3.

The results show that the liquid crystal composition prepared in Comparative Example 2 gave worse results than the liquid crystal composition prepared in Example 1. The liquid crystal composition prepared in Comparative Example 2 also had a slower response rate than the liquid crystal composition prepared in Example 1.

Comparative Example 3

A liquid crystal display device of Comparative Example 3 was fabricated as in Example 1 except that a liquid crystal composition having the composition shown in Table 4 was prepared and used.

TABLE 4

| | |
|---|---|
| $T_{NI}/°C.$ | 81.1 |
| $\Delta n$ | 0.104 |
| $n_o$ | 1.488 |
| $\varepsilon_{//}$ | 3.7 |
| $\varepsilon_\perp$ | 6.5 |
| $\Delta\varepsilon$ | -2.9 |
| $\eta/mPa \cdot s$ | 26.6 |
| $\gamma_1/mPa \cdot s$ | 146 |
| $\gamma_1/\Delta n^2 \times 10^{-2}$ | 135 |
| 3CyCy2 | 24% |
| 3CyCy4 | 7% |
| 3CyPhO1 | 23% |
| 3PhPh5Ph2 | 5% |
| 4PhPh5Ph2 | 5% |
| 3Cy1ONd4O4 | 3% |
| 5Cy1ONd4O2 | 3% |
| 5Cy1ONd4O3 | 2% |
| 3Cy2Cy1ONd4O2 | 7% |
| 3Cy2Cy1ONd4O3 | 7% |
| 2CyCy1ONd4O2 | 7% |
| 3CyCy1ONd4O4 | 7% |
| Drop mark evaluation | C |
| Image-sticking evaluation | C |
| Response rate/ms | 10.6 |

The liquid crystal display device of Comparative Example 3 was tested for image-sticking and drop marks by the same methods as in Example 1. The results are shown in Table 4.

The results show that the liquid crystal composition prepared in Comparative Example 3 gave worse results than the liquid crystal composition prepared in Example 1. The liquid crystal composition prepared in Comparative Example 3 also had a slower response rate than the liquid crystal composition prepared in Example 1.

Comparative Example 4

A liquid crystal display device of Comparative Example 4 was fabricated as in Example 1 except that a liquid crystal composition having the composition shown in Table 5 was prepared and used.

TABLE 5

| | |
|---|---|
| $T_{NI}/°C$ | 79.9 |
| $\Delta n$ | 0.104 |
| $n_o$ | 1.486 |
| $\varepsilon_{//}$ | 3.7 |
| $\varepsilon_\perp$ | 6.5 |
| $\Delta\varepsilon$ | -2.9 |
| $\eta/mPa \cdot s$ | 29.7 |
| $\gamma_1/mPa \cdot s$ | 144 |
| $\gamma_1/\Delta n^2 \times 10^{-2}$ | 132 |
| 3CyCy2 | 24% |
| 3CyCy4 | 2% |
| 3CyPhO1 | 19% |
| 3PhPh5Ph2 | 6% |
| 4PhPh5Ph2 | 6% |
| 3Cy1ONd4O4 | 3% |
| 5Cy1ONd4O2 | 3% |
| 5Cy1ONd4O3 | 2% |
| 3Cy2Cy1ONd4O2 | 4% |
| 3Cy2Cy1ONd4O3 | 4% |
| 2CyCy1ONd4O2 | 4% |
| 3CyCy1ONd4O4 | 4% |
| 3Cy2Ph5O4 | 2% |
| 4Cy2Ph5O2 | 2% |
| 3CyCy2Ph5O3 | 5% |
| 3CyCy2Ph5O4 | 5% |
| 3CyCy2Ph5O2 | 5% |
| Drop mark evaluation | C |
| Image-sticking evaluation | C |
| Response rate/ms | 10.5 |

The liquid crystal display device of Comparative Example 4 was tested for image-sticking and drop marks by the same methods as in Example 1. The results are shown in Table 5.

The results show that the liquid crystal composition prepared in Comparative Example 4 gave worse results than the liquid crystal composition prepared in Example 1. The liquid crystal composition prepared in Comparative Example 4 also had a slower response rate than the liquid crystal composition prepared in Example 1.

Comparative Example 5

A liquid crystal display device of Comparative Example 5 was fabricated as in Example 1 except that a liquid crystal composition having the composition shown in Table 6 was prepared and used.

TABLE 6

| | |
|---|---|
| $T_{NI}/°C$ | 80.2 |
| $\Delta n$ | 0.093 |
| $n_o$ | 1.484 |
| $\varepsilon_{//}$ | 3.9 |
| $\varepsilon_\perp$ | 7.7 |
| $\Delta\varepsilon$ | -3.7 |
| $\eta/mPa \cdot s$ | 30.5 |
| $\gamma_1/mPa \cdot s$ | 153 |
| $\gamma_1/\Delta n^2 \times 10^{-2}$ | 175 |
| 3CyCy2 | 24% |
| 3CyCy4 | 6% |
| 3CyPhO1 | 25% |
| 3Cy1ONd4O4 | 5% |
| 5Cy1ONd4O2 | 5% |
| 5Cy1ONd4O3 | 5% |
| 3Cy2Cy1ONd4O2 | 8% |
| 3Cy2Cy1ONd4O3 | 8% |
| 2CyCy1ONd4O2 | 7% |
| 3CyCy1ONd4O4 | 7% |
| Drop mark evaluation | D |
| Image-sticking evaluation | D |
| Response rate/ms | 13.6 |

The liquid crystal display device of Comparative Example 5 was tested for image-sticking and drop marks by the same methods as in Example 1. The results are shown in Table 6.

The results show that the liquid crystal composition prepared in Comparative Example 5 gave worse results than the liquid crystal composition prepared in Example 1. The liquid crystal composition prepared in Comparative Example 5 also had a slower response rate than the liquid crystal composition prepared in Example 1.

Comparative Example 6

A liquid crystal display device of Comparative Example 6 was fabricated as in Example 1 except that a liquid crystal composition having the composition shown in Table 7 was prepared and used.

TABLE 7

| | |
|---|---|
| $T_{NI}/°C$ | 80.7 |
| $\Delta n$ | 0.089 |
| $n_o$ | 1.482 |
| $\varepsilon_{//}$ | 3.7 |
| $\varepsilon_\perp$ | 6.8 |
| $\Delta\varepsilon$ | -3.1 |
| $\eta/mPa \cdot s$ | 29.9 |
| $\gamma_1/mPa \cdot s$ | 130 |
| $\gamma_1/\Delta n^2 \times 10^{-2}$ | 164 |
| 3CyCy2 | 24% |
| 3CyCy4 | 2% |
| 3CyPhO1 | 25% |
| 3Cy1ONd4O4 | 2% |
| 5Cy1ONd4O2 | 2% |
| 5Cy1ONd4O3 | 2% |
| 3Cy2Cy1ONd4O2 | 6% |
| 3Cy2Cy1ONd4O3 | 6% |
| 2CyCy1ONd4O2 | 6% |
| 3CyCy1ONd4O4 | 5% |
| 3Cy2Ph5O4 | 2% |
| 4Cy2Ph5O2 | 2% |
| 3CyCy2Ph5O3 | 5% |
| 3CyCy2Ph5O4 | 6% |
| 3CyCy2Ph5O2 | 5% |
| Drop mark evaluation | D |
| Image-sticking evaluation | D |
| Response rate/ms | 12.8 |

The liquid crystal display device of Comparative Example 6 was tested for image-sticking and drop marks by the same methods as in Example 1. The results are shown in Table 7.

The results show that the liquid crystal composition prepared in Comparative Example 6 gave worse results than the liquid crystal composition prepared in Example 1. The liquid crystal composition prepared in Comparative Example 6 also had a slower response rate than the liquid crystal composition prepared in Example 1.

Example 2

A liquid crystal display device of Example 2 was fabricated as in Example 1 except that the vertical alignment layer material used was a polyimide solution containing 3% of a polyimide precursor (JALS2131-R6, JSR Corporation) and also containing 2% of the reactive-group-containing polymerizable compound represented by formula (V-2) and 1% of a reactive-group-containing polymerizable compound represented by formula (VI-2) below.

[Chem. 30]

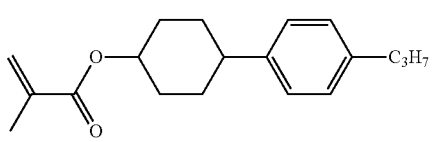

(VI-2)

The liquid crystal display device of Example 2 was tested for image-sticking and drop marks by the same methods as in Example 1. The results are shown in Table 8.

The results show that, although the liquid crystal display device of Example 2 gave slightly worse results than the liquid crystal display device of Example 1, it had fast response rate, few drop marks, and good image-sticking characteristics.

TABLE 8

| | |
|---|---|
| Drop mark evaluation | B |
| Image-sticking evaluation | B |
| Response rate/ms | 8.2 |

Example 3

A liquid crystal display device of Example 3 was fabricated as in Example 1 except that the vertical alignment layer material used was a polyimide solution containing 3% of a polyimide precursor (JALS2131-R6, JSR Corporation) and also containing 2% of a reactive-group-containing polymerizable compound represented by formula (V-4a) below and 1% of the reactive-group-containing polymerizable compound represented by formula (VI-1).

[Chem. 31]

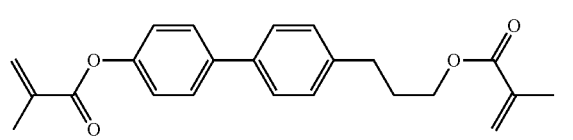

(V-4a)

The liquid crystal display device of Example 3 was tested for image-sticking and drop marks by the same methods as in Example 1. The results are shown in Table 9.

The results show that, although the liquid crystal display device of Example 3 gave slightly worse results than the liquid crystal display device of Example 1, it had fast response rate, few drop marks, and good image-sticking characteristics.

TABLE 9

| | |
|---|---|
| Drop mark evaluation | B |
| Image-sticking evaluation | B |
| Response rate/ms | 8.3 |

Example 4

A liquid crystal display device of Example 4 was fabricated as in Example 1 except that the vertical alignment layer material used was a polyimide solution containing 3% of a polyimide precursor (JALS2131-R6, JSR Corporation) and also containing 2% of a reactive-group-containing polymerizable compound represented by formula (V-5) below and 1% of the reactive-group-containing polymerizable compound represented by formula (VI-2).

[Chem. 32]

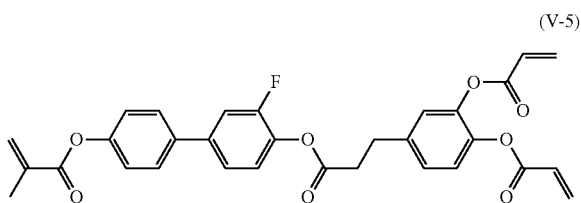

(V-5)

The liquid crystal display device of Example 4 was tested for image-sticking and drop marks by the same methods as in Example 1. The results are shown in Table 10.

The results show that, although the liquid crystal display device of Example 4 gave slightly worse results than the liquid crystal display device of Example 1, it had fast response rate, few drop marks, and good image-sticking characteristics.

TABLE 10

| | |
|---|---|
| Drop mark evaluation | B |
| Image-sticking evaluation | B |
| Response rate/ms | 8.3 |

Example 5

A liquid crystal display device of Example 5 was fabricated as in Example 1 except that a liquid crystal composition having the composition shown in Table 11 was prepared and used.

TABLE 11

| | |
|---|---|
| $T_{NI}/°$ C. | 80.2 |
| $\Delta n$ | 0.105 |
| $n_o$ | 1.485 |
| $\varepsilon_{//}$ | 3.2 |
| $\varepsilon_{\perp}$ | 6.1 |
| $\Delta \varepsilon$ | -2.9 |
| $\eta$/mPa · s | 22.7 |
| $\gamma_1$/mPa · s | 124 |
| $\gamma_1/\Delta n^2 \times 10^{-2}$ | 112 |
| 3CyCy2 | 20% |
| 3CyCy4 | 10% |
| 3CyPh5O2 | 7% |
| 3CyPh5O4 | 7% |
| 5CyPhPh5O2 | 6% |
| 5CyPhPh5O2 | 7% |

TABLE 11-continued

| | |
|---|---|
| 3CyCyPh5O3 | 7% |
| 3CyCyPh5O2 | 8% |
| 5CyCyPh5O2 | 7% |
| 3PhPh5Ph2 | 4% |
| 4PhPh5Ph2 | 4% |
| 5PhPh1 | 8% |
| 3CyCyPh1 | 5% |
| Drop mark evaluation | B |
| Image-sticking evaluation | B |
| Response rate/ms | 9.1 |

The liquid crystal display device of Example 5 was tested for image-sticking and drop marks by the same methods as in Example 1. The results are shown in Table 11.

The results show that, although the liquid crystal display device of Example 5 gave slightly worse results than the liquid crystal display device of Example 1, it had relatively fast response rate, few drop marks, and good image-sticking characteristics.

Example 6

A liquid crystal display device of Example 6 was fabricated as in Example 1 except that a liquid crystal composition having the composition shown in Table 12 was prepared and used.

TABLE 12

| | |
|---|---|
| $T_{NI}/°C.$ | 80.3 |
| $\Delta n$ | 0.106 |
| no | 1.486 |
| $\varepsilon_{//}$ | 3.3 |
| $\varepsilon_{\perp}$ | 6.2 |
| $\Delta\varepsilon$ | −2.9 |
| $\eta/mPa \cdot s$ | 21.4 |
| $\gamma_1/mPa \cdot s$ | 121 |
| $\gamma_1/\Delta n^2 \times 10^{-2}$ | 107 |
| 3CyCy2 | 23% |
| 3CyCy4 | 5% |
| 3CyPhO1 | 7% |
| 2CyPh5O2 | 8% |
| 3CyPh5O4 | 7% |
| 2CyPhPh5O2 | 7% |
| 3CyPhPh5O2 | 9% |
| 3CyCyPh5O3 | 5% |
| 4CyCyPh5O2 | 6% |
| 5CyCyPh5O2 | 5% |
| 3PhPh5Ph2 | 5% |
| 4PhPh5Ph2 | 6% |
| 3CyCyPh1 | 7% |
| Drop mark evaluation | B |
| Image-sticking evaluation | B |
| Response rate/ms | 8.4 |

The liquid crystal display device of Example 6 was tested for image-sticking and drop marks by the same methods as in Example 1.

The results are shown in Table 12.

The results show that, although the liquid crystal display device of Example 6 gave slightly worse results than the liquid crystal display device of Example 1, it had relatively fast response rate, few drop marks, and good image-sticking characteristics.

Example 7

A liquid crystal display device of Example 7 was fabricated as in Example 1 except that a liquid crystal composition having the composition shown in Table 13 was prepared and used.

TABLE 13

| | |
|---|---|
| $T_{NI}/°C.$ | 81.3 |
| $\Delta n$ | 0.106 |
| no | 1.483 |
| $\varepsilon_{//}$ | 3.2 |
| $\varepsilon_{\perp}$ | 6.0 |
| $\Delta\varepsilon$ | −2.8 |
| $\eta/mPa \cdot s$ | 20.7 |
| $\gamma_1/mPa \cdot s$ | 117 |
| $\gamma_1/\Delta n^2 \times 10^{-2}$ | 105 |
| 3CyCy2 | 21% |
| 3CyCy4 | 12% |
| 3CyCy5 | 5% |
| 2CyPh5O2 | 7% |
| 3CyPh5O4 | 8% |
| 2CyPhPh5O2 | 7% |
| 3CyPhPh5O2 | 7% |
| 3CyCyPh5O3 | 5% |
| 4CyCyPh5O2 | 5% |
| 5CyCyPh5O2 | 5% |
| 3PhPh5Ph2 | 7% |
| 4PhPh5Ph2 | 8% |
| 3CyCyPh1 | 3% |
| Drop mark evaluation | B |
| Image-sticking evaluation | B |
| Response rate/ms | 8.2 |

The liquid crystal display device of Example 7 was tested for image-sticking and drop marks by the same methods as in Example 1. The results are shown in Table 13.

The results show that, although the liquid crystal display device of Example 7 gave slightly worse results than the liquid crystal display device of Example 1, it had relatively fast response rate, few drop marks, and good image-sticking characteristics.

Example 8

A liquid crystal display device of Example 8 was fabricated as in Example 1 except that a liquid crystal composition having the composition shown in Table 14 was prepared and used.

TABLE 4

| | |
|---|---|
| $T_{NI}/°C.$ | 82.7 |
| $\Delta n$ | 0.107 |
| no | 1.486 |
| $\varepsilon_{//}$ | 3.3 |
| $\varepsilon_{\perp}$ | 6.3 |
| $\Delta\varepsilon$ | −3.0 |
| $\eta/mPa \cdot s$ | 24.2 |
| $\gamma_1/mPa \cdot s$ | 141 |
| $\gamma_1/\Delta n^2 \times 10^{-2}$ | 123 |
| 3CyCy2 | 24% |
| 3CyCy4 | 5% |
| 3CyPhO1 | 6% |
| 2CyPh5O2 | 5% |
| 3CyPh5O4 | 5% |
| 2CyPhPh5O2 | 7% |
| 3CyPhPh5O2 | 9% |
| 3CyCyPh5O3 | 8% |
| 4CyCyPh5O2 | 9% |
| 5CyCyPh5O2 | 8% |
| 3PhPh5Ph2 | 5% |
| 4PhPh5Ph2 | 5% |
| 5PhPh1 | 4% |
| Drop mark evaluation | B |
| Image-sticking evaluation | B |
| Response rate/ms | 9.7 |

The liquid crystal display device of Example 8 was tested for image-sticking and drop marks by the same methods as in Example 1. The results are shown in Table 14.

The results show that, although the liquid crystal display device of Example 8 gave slightly worse results than the liquid crystal display device of Example 1, it had relatively fast response rate, few drop marks, and good image-sticking characteristics.

Example 9

A liquid crystal display device of Example 9 was fabricated as in Example 1 except that a liquid crystal composition having the composition shown in Table 15 was prepared and used.

TABLE 15

| | |
|---|---|
| $T_{NI}/°C.$ | 82.4 |
| Δn | 0.103 |
| $n_o$ | 1.483 |
| $ε_{//}$ | 3.4 |
| $ε_⊥$ | 6.1 |
| Δε | −2.8 |
| η/mPa · s | 19.3 |
| $γ_1$/mPa · s | 143 |
| $γ_1/Δn^2 × 10^{-2}$ | 135 |
| 3CyCy2 | 24% |
| 3CyCy4 | 10% |
| 3CyCy5 | 7% |
| 3CyPhO1 | 2% |
| 3PhPh5O2 | 5% |
| 3CyPh5O2 | 8% |
| 2CyPhPh5O2 | 8% |
| 3CyPhPh5O2 | 9% |
| 3CyCyPh5O3 | 5% |
| 4CyCyPh5O2 | 6% |
| 5CyCyPh5O2 | 6% |
| 3PhPh5Ph2 | 5% |
| 4PhPh5Ph2 | 5% |
| Drop mark evaluation | A |
| Image-sticking evaluation | A |
| Response rate/ms | 7.9 |

The liquid crystal display device of Example 9 was tested for image-sticking and drop marks by the same methods as in Example 1. The results are shown in Table 15.

The results show that the liquid crystal display device of Example 9 had a response rate comparable to that of the liquid crystal display device of Example 1 and also had few drop marks and good image-sticking characteristics.

Example 10

A liquid crystal display device of Example 10 was fabricated as in Example 1 except that a liquid crystal composition having the composition shown in Table 16 was prepared and used.

TABLE 16

| | |
|---|---|
| $T_{NI}/°C.$ | 81.7 |
| Δn | 0.109 |
| $n_o$ | 1.486 |
| $ε_{//}$ | 3.3 |
| $ε_⊥$ | 6.3 |
| Δε | −2.9 |
| η/mPa · s | 19.0 |
| $γ_1$/mPa · s | 147 |
| $γ_1/Δn^2 × 10^{-2}$ | 124 |
| 3CyCy2 | 24% |
| 3CyCy4 | 10% |
| 3CyCy5 | 7% |
| 3CyPhO1 | 2% |
| 3PhPh5O2 | 13% |
| 2CyPhPh5O2 | 8% |
| 3CyPhPh5O2 | 9% |
| 3CyCyPh5O3 | 5% |
| 4CyCyPh5O2 | 6% |
| 5CyCyPh5O2 | 6% |

TABLE 16-continued

| | |
|---|---|
| 3PhPh5Ph2 | 5% |
| 4PhPh5Ph2 | 5% |
| Drop mark evaluation | A |
| Image-sticking evaluation | A |
| Response rate/ms | 8.2 |

The liquid crystal display device of Example 10 was tested for image-sticking and drop marks by the same methods as in Example 1. The results are shown in Table 16.

The results show that the liquid crystal display device of Example 10 had a response rate comparable to that of the liquid crystal display device of Example 1 and also had few drop marks and good image-sticking characteristics.

REFERENCE SIGNS LIST 10 liquid crystal display device
11 first substrate
12 second substrate
13 liquid crystal composition layer
14 common electrode
15 pixel electrode
16 vertical alignment layer
17 vertical alignment layer
18 color filter
19 liquid crystal molecule

The invention claimed is:
1. A liquid crystal display device comprising a first substrate having a common electrode, a second substrate having a pixel electrode, and a liquid crystal composition layer disposed between the first and second substrates, wherein a charge is applied across the common electrode and the pixel electrode substantially perpendicularly to the first and second substrates to control liquid crystal molecules in the liquid crystal composition layer, at least one of the first and second substrates having a vertical alignment layer that controls the orientation of the liquid crystal molecules in the liquid crystal composition layer substantially perpendicularly to surfaces of the first and second substrates adjacent to the liquid crystal composition layer, the vertical alignment layer comprising a polymer of a monofunctional reactive-group-containing polymerizable compound and a polyfunctional reactive-group-containing polymerizable compound, wherein the monofunctional reactive-group-containing polymerizable compound is a polymerizable compound represented by general formula (VI):

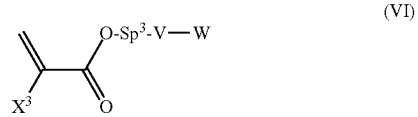

(wherein $X^3$ is hydrogen or methyl; $Sp^3$ is a single bond, an alkylene group of 1 to 8 carbon atoms, or —O—$(CH_2)_t$— (wherein t is an integer of 2 to 7, and the oxygen atom is linked to the aromatic ring); V is a linear or branched polyvalent alkylene group of 2 to 20 carbon atoms or a polyvalent cyclic substituent of 5 to 30 carbon atoms, wherein the alkylene group in the polyvalent alkylene group is optionally substituted with oxygen such that no oxygen atoms are adjacent to each other, is optionally substituted with an alkyl group of 5 to 20 carbon atoms (wherein the alkylene group in the group is optionally substituted with oxygen such that no oxygen atoms are adjacent to each other), and is optionally substituted with a cyclic substituent; and W is hydrogen, halogen, or an alkylene group of 1 to 8 carbon atoms); and wherein the polyfunctional reactive-group-containing polymerizable compound is a polymerizable compound represented by general formula (V):

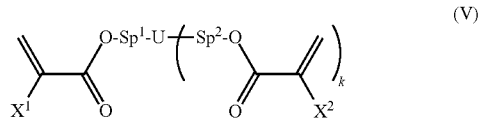

(V)

(wherein $X^1$ and $X^2$ are each independently hydrogen or methyl; $Sp^1$ and $Sp^2$ are each independently a single bond, an alkylene group of 1 to 8 carbon atoms, or —O—$(CH_2)_s$— (wherein s is an integer of 2 to 7, and the oxygen atom is linked to the aromatic ring); U is a linear or branched polyvalent alkylene group of 2 to 20 carbon atoms or a polyvalent cyclic substituent of 5 to 30 carbon atoms, wherein the alkylene group in the polyvalent alkylene group is optionally substituted with oxygen such that no oxygen atoms are adjacent to each other, is optionally substituted with an alkyl group of 5 to 20 carbon atoms (wherein the alkylene group in the group is optionally substituted with oxygen such that no oxygen atoms are adjacent to each other), and is optionally substituted with a cyclic substituent; and k is an integer of 1 to 5).

2. The liquid crystal display device according to claim 1, wherein the liquid crystal display device has a plurality of pixels, each comprising two or more domains with different pretilt angles.

3. The liquid crystal display device according to claim 1, wherein the vertical alignment layer further comprises a polyimide structure.

4. The liquid crystal display device according to claim 1, wherein the vertical alignment layer is disposed on each of the surfaces of the first and second substrates adjacent to the liquid crystal composition layer, and the first substrate has a color filter layer.

5. The liquid crystal display device according to claim 1, wherein the pixel electrode has a comb-like pattern of slits extending from the center of the pixel in four directions and has four domains in which the liquid crystal molecules in the liquid crystal composition layer are oriented in different directions.

6. The liquid crystal display device according to claim 1, wherein the liquid crystal composition layer is formed by one-drop filling process.

7. The liquid crystal display device according to claim 1, wherein the liquid crystal composition layer comprises a liquid crystal composition comprising a compound represented by general formula (I):

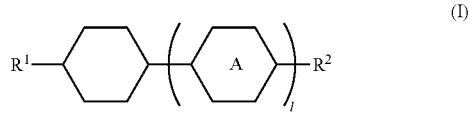

(I)

(wherein $R^1$ are $R^2$ are each independently an alkyl group of 1 to 8 carbon atoms, an alkenyl group of 2 to 8 carbon atoms, an alkoxy group of 1 to 8 carbon atoms, or an alkenyloxy group of 2 to 8 carbon atoms; A is 1,4-phenylene or trans-1,4-cyclohexylene; and l is 1 or 2, wherein if l is 2, each A may be the same or different) and a compound represented by general formula (II):

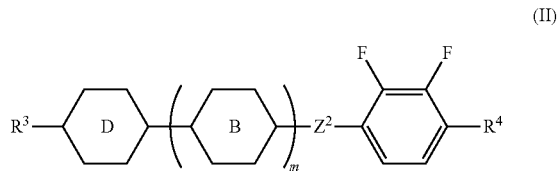

(II)

(wherein $R^3$ is an alkyl group of 1 to 8 carbon atoms, an alkenyl group of 2 to 8 carbon atoms, an alkoxy group of 1 to 8 carbon atoms, or an alkenyloxy group of 2 to 8 carbon atoms; $R^4$ is an alkyl group of 1 to 8 carbon atoms, an alkenyl group of 4 to 8 carbon atoms, an alkoxy group of 1 to 8 carbon atoms, or an alkenyloxy group of 3 to 8 carbon atoms; B and D are each independently 1,4-phenylene or trans-1,4-cyclohexylene; $Z^2$ is a single bond, —$OCH_2$—, —OCO—, —$CH_2O$—, or —COO—; and m is 0, 1, or 2, wherein if m is 2, each B may be the same or different).

8. The liquid crystal display device according to claim 7, wherein the compound represented by general formula (I) is present in the liquid crystal composition in an amount of 30% to 60% by mass, and the compound represented by general formula (II) is present in the liquid crystal composition in an amount of 30% to 65% by mass.

9. uid crystal display device according to claim 7, wherein the liquid crystal composition further comprises 5% to 20% by mass of a compound represented by general formula (III):

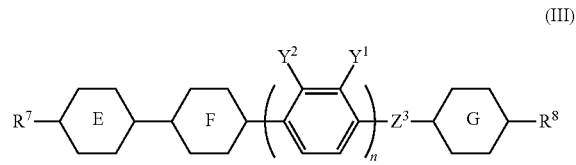

(III)

(wherein $R^7$ and $R^8$ are each independently an alkyl group of 1 to 8 carbon atoms, an alkenyl group of 2 to 8 carbon atoms, an alkoxy group of 1 to 8 carbon atoms, or an alkenyloxy group of 2 to 8 carbon atoms; $Y^1$ and $Y^2$ and each independently hydrogen or fluorine; E, F, and G are each independently 1,4-phenylene or trans-1,4-cyclohexylene; $Z^3$ is a single bond, —$OCH_2$—, —OCO—, —$CH_2O$—, or —COO—; and n is 0 or 1).

10. A method for manufacturing a liquid crystal display device, comprising applying an alignment material comprising a monofunctional reactive-group-containing polymerizable compound, a polyfunctional reactive-group-containing polymerizable compound, and a vertical alignment material to at least one of a first substrate having a common electrode and a second substrate having a pixel electrode; heating the alignment material to form an alignment layer; providing a liquid crystal composition between the first and second substrates; and irradiating the liquid crystal composition with radiation to polymerize the polymerizable compounds in the alignment layer while applying a voltage across the common electrode and the pixel electrode, wherein the monofunctional reactive-group-containing polymerizable compound is a polymerizable compound represented by general formula (VI):

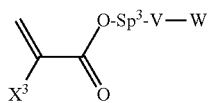

(VI)

(wherein $X^3$ is hydrogen or methyl; $Sp^3$ is a single bond, an alkylene group of 1 to 8 carbon atoms, or —O—$(CH_2)_t$— (wherein t is an integer of 2 to 7, and the oxygen atom is linked to the aromatic ring); V is a linear or branched polyvalent alkylene group of 2 to 20 carbon atoms or a polyvalent cyclic substituent of 5 to 30 carbon atoms, wherein the alkylene group in the polyvalent alkylene group is optionally substituted with oxygen such that no oxygen atoms are adjacent to each other, is optionally substituted with an alkyl group of 5 to 20 carbon atoms (wherein the alkylene group in the group is optionally substituted with oxygen such that no oxygen atoms are adjacent to each other), and is optionally substituted with a cyclic substituent; and W is hydrogen, halogen, or an alkylene group of 1 to 8 carbon atoms); and the polyfunctional reactive-group-containing polymerizable compound is a polymerizable compound represented by general formula (V):

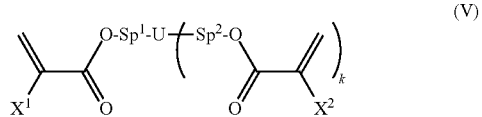

(V)

(wherein $X^1$ and $X^2$ are each independently hydrogen or methyl; $Sp^1$ and $Sp^2$ are each independently a single bond, an alkylene group of 1 to 8 carbon atoms, or —O—$(CH_2)_s$— (wherein s is an integer of 2 to 7, and the oxygen atom is linked to the aromatic ring); U is a linear or branched polyvalent alkylene group of 2 to 20 carbon atoms or a polyvalent cyclic substituent of 5 to 30 carbon atoms, wherein the alkylene group in the polyvalent alkylene group is optionally substituted with oxygen such that no oxygen atoms are adjacent to each other, is optionally substituted with an alkyl group of 5 to 20 carbon atoms (wherein the alkylene group in the group is optionally substituted with oxygen such that no oxygen atoms are adjacent to each other), and is optionally substituted with a cyclic substituent; and k is an integer of 1 to 5).

11. The method for manufacturing a liquid crystal display device according to claim 10, wherein the radiation is ultraviolet radiation, and the liquid crystal composition is irradiated with the radiation at an intensity of 2 to 100 mW/cm$^{-2}$ to a total dose of 10 to 300 J.

12. The method for manufacturing a liquid crystal display device according to claim 10, wherein the compound represented by general formula (I) is present in the liquid crystal composition in an amount of 30% to 50% by mass, and the compound represented by general formula (II) is present in the liquid crystal composition in an amount of 30% to 50% by mass.

* * * * *